(12) United States Patent
Zhao et al.

(10) Patent No.: US 10,305,791 B2
(45) Date of Patent: May 28, 2019

(54) USING PCE AS SDN CONTROLLER

(71) Applicant: Futurewei Technologies, Inc., Plano, TX (US)

(72) Inventors: Qianglin Quintin Zhao, Boxborough, MA (US); Katherine Zhao, San Jose, CA (US); Bisong Tao, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 40 days.

(21) Appl. No.: 15/728,387

(22) Filed: Oct. 9, 2017

(65) Prior Publication Data

US 2018/0034730 A1 Feb. 1, 2018

Related U.S. Application Data

(63) Continuation of application No. 15/239,654, filed on Aug. 17, 2016, now Pat. No. 9,813,333, which is a
(Continued)

(51) Int. Cl.
*H04L 12/723* (2013.01)
*H04L 12/717* (2013.01)
*H04L 12/759* (2013.01)

(52) U.S. Cl.
CPC ............ *H04L 45/50* (2013.01); *H04L 45/028* (2013.01); *H04L 45/42* (2013.01); *H04L 45/507* (2013.01)

(58) Field of Classification Search
CPC ....... H04L 45/50; H04L 45/42; H04L 45/028; H04L 45/507; H04L 47/10; H04L 12/5602; H04L 2012/5608; H04L 49/254; H04L 12/4035; H04W 80/04; H04W 8/26; H04W 84/12; H04W 88/08; H04W 88/06;
(Continued)

(56) References Cited

U.S. PATENT DOCUMENTS 8,131,873 B2 3/2012 Vasseur et al.
8,693,374 B1 4/2014 Murphy
(Continued)

OTHER PUBLICATIONS

Ali, Z. et al., "Path Computation Element Communication Protocol (PCEP) Extensions for remote-initiated GMPLS LSP Setup," draft-ali-pce-remote-initiated-gmpls-lsp-03.txt, Feb. 14, 2014, 9 pages.
(Continued)

*Primary Examiner* — Brenda H Pham
(74) *Attorney, Agent, or Firm* — James Harrison

(57) ABSTRACT

Embodiments relate generally to systems and methods for transitioning a system from a tradition network to a Software Defined Network (SDN) enabled network. In some embodiments, the systems and methods may comprise the use of a Path Computation Element (PCE) as a central controller. Smooth transition between traditional network and the new SDN enabled network, especially from a cost impact assessment perspective, may be accomplished using the existing PCE components from the current network to function as the central controller of the SDN network is one choice, which not only achieves the goal of having a centralized controller to provide the functionalities needed for the central controller, but also leverages the existing PCE network components.

11 Claims, 14 Drawing Sheets

Related U.S. Application Data continuation of application No. 14/511,591, filed on Oct. 10, 2014, now Pat. No. 9,450,864.

(60) Provisional application No. 61/889,978, filed on Oct. 11, 2013.

(58) Field of Classification Search
CPC .............. H04W 84/18; H04W 74/08; H04Q 2213/13003; H04Q 11/0478; H04Q 2213/13299; H04M 9/025
USPC .... 370/349, 389, 310.2, 328, 338, 360, 362, 370/400, 231, 395.5
See application file for complete search history.

(56) References Cited

U.S. PATENT DOCUMENTS

| | | | |
|---|---|---|---|
| 8,953,500 B1* | 2/2015 | Shen | H04L 45/16 370/238 |
| 9,450,817 B1* | 9/2016 | Bahadur | H04L 45/64 |
| 9,450,860 B2 | 9/2016 | Averbuj et al. | |
| 2007/0133406 A1 | 6/2007 | Vasseur | |
| 2007/0217419 A1 | 9/2007 | Vasseur | |
| 2008/0298805 A1 | 12/2008 | Lee et al. | |
| 2013/0329601 A1 | 12/2013 | Yin et al. | |
| 2015/0063802 A1* | 3/2015 | Bahadur | H04L 47/125 398/49 |

OTHER PUBLICATIONS

Crabbe, E et al., "PCEP Extensions for PCE-Initiated LSP Setup in a Stateful PCE Model," draft-crabbe-pce-pce-initiated-lsp-03, Oct. 10, 2013, 17 pages.

Filsfils, C., Ed. et al., "Segment Routing Architecture," draft-filsfils-spring-segment-routing-04, Jul. 3, 2014, 18 pages.

Previdi, S., Ed. et al., "IS-IS Extensions for Segment Routing," draft-ietf-isis-segment-routing-extensions-02, Jun. 18, 2014, 32 pages.

Crabbe, E. et al., "PCEP Extensions for Stateful PCE," draft-ietf-pce-stateful-pce-09, Jun. 22, 2014, 47 pages.

Pierre, F. et al., "Use-cases for Resiliency in Spring," draft-ietf-spring-resiliency-use-cases-00, May 12, 2014, 8 pages.

Li, Z. et al., "A Framework of MPLS Global Label," draft-ietf-li-mpls-global-label-framework-02, Jul. 3, 2014, 14 pages.

Li, Z. et al., "Use Cases of MPLS Global Label," draft-li-mpls-global-label-usecases-02, Jul. 3, 2014, 9 pages.

Psenak, R, Ed. et al., "OSPF Extensions for Segment Routing," draft-psenak-ospf-segment-routing-extensions-05, Jun. 5, 2014, 33 pages.

Sivabalan, S. et al., "PCEP Extensions for Segment Routing," draft-sivabalan-pce-segment-routing-02, Oct. 16, 2013, 18 pages.

Zhao, Q. et al., "The Use Cases for Using PCE as the Central Controller {PCECC} of LSPs," draft-zhao-pee-central-controller-user-cases-01, Jul. 4, 2014, 24 pages.

Zhao, Q. et al., "PCEP Procedures and Protocol Extensions for Using PCE as a Central Controller (PCECC) of LSPs," draft-zhao-pce-extension-for-pce-controller-00, Feb. 2014, 20 pages.

Bradner, S., "Key Words for use in RFCs to Indicate Requirement Levels," RFC 2119, Mar. 1997, 3 pages.

Vasseur, JP., Ed. et al., "Path Computation Element (PCE) Communication Protocol (PCEP)," RFC 5440, Mar. 2009, 87 pages.

Vasseur, JP., Ed. et al., "A Backward-Recursive PCE-Based Computation (BRPC) Procedure to Compute Shortest Constrained Inter-Domain Traffic Engineering Label Switched Paths," RFC 5441, Apr. 2009, 18 pages.

Leroux, JL. et al., "Encoding of Objective Functions in the Path Computation Element Communication Protocol (PCEP)," RFC 5541, Jun. 2009, 23 pages.

"OpenFlow Controller/Switch NOM Synchronization," Open Networking Foundation, V1.0, Aug. 15, 2014, 8 pages.

"OpenFlow Switch Specification," Open Networking Foundation, V1.3.4, Protocol Version 0x04, Mar. 27, 2014, 171 pages.

"Software-Defined Networking: The New Norm for Networks," Open Networking Foundation, ONF White Paper, Apr. 13, 2012, 12 pages.

\* cited by examiner

USING PCE AS SDN CONTROLLER

CROSS-REFERENCE TO RELATED APPLICATIONS

This application is a continuation of U.S. patent application Ser. No. 15/239,654, filed on Aug. 17, 2016, which is a continuation of U.S. patent application Ser. No. 14/511,591, filed on Oct. 10, 2014, which claims priority to U.S. Provisional Patent Application No. 61/889,978 filed Oct. 11, 2013. All of the aforementioned applications are hereby incorporated herein by reference as if reproduced in their entireties.

BACKGROUND

In certain network deployment scenarios, service providers would benefit from the ability to dynamically adapt to a wide range of customer's requests for the sake of flexible network service delivery. The Software Defined Network (SDN) provides additional flexibility to network operation in comparison to the traditional network. However, existing networking ecosystems have become complex and highly demanding in terms of robustness, performance, scalability, flexibility, agility, etc. Additionally, when migrating to an SDN enabled network from an existing network, service providers and network operators may have difficulty keeping the network services scalable, guarantee robustness and availability, etc.

SUMMARY

In one embodiment, the disclosure includes a Path Computation Element (PCE) comprising a receiver configured to receive a path computation request from a path computation client (PCC), the path computation request requesting a path initiating at the PCC, a processor coupled to the receiver and configured to compute the path from the PCC to the egress node via an intermediate node in response to the path computation request, and assign label information for a label switched path (LSP) from the PCC, the intermediate node, and the egress node, and a transmitter coupled to the processor and configured to set up the LSP along the computed path by transmitting the label information directly to the PCC, the intermediate node, and the egress node for storage in a Forwarding Information Base (FIB).

In another embodiment, the disclosure includes a method of managing a mixed domain of SDN compatible nodes and non-SDN compatible nodes with a PCE, the method comprising receiving a path computation request from an SDN compatible ingress node, the path computation request requesting a path to a non-SDN compatible egress node, computing a path from the ingress to the egress node in response to the path computation request; assigning label information for each node along the computed path, and setting up a LSP along the computed path by transmitting the label information directly to the SDN compatible ingress node and the non-SDN compatible egress node.

In yet another embodiment, the disclosure includes a method for using a PCE as a central controller in a network comprising receiving, by the PCE, a pathway request from a PCC, performing, by the PCE, route computations in response to the request from the PCC, and directly controlling, by the PCE, the PCC and a plurality of nodes in communication with the PCC to set up a pathway based on the route computations.

These and other features will be more clearly understood from the following detailed description taken in conjunction with the accompanying drawings and claims.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
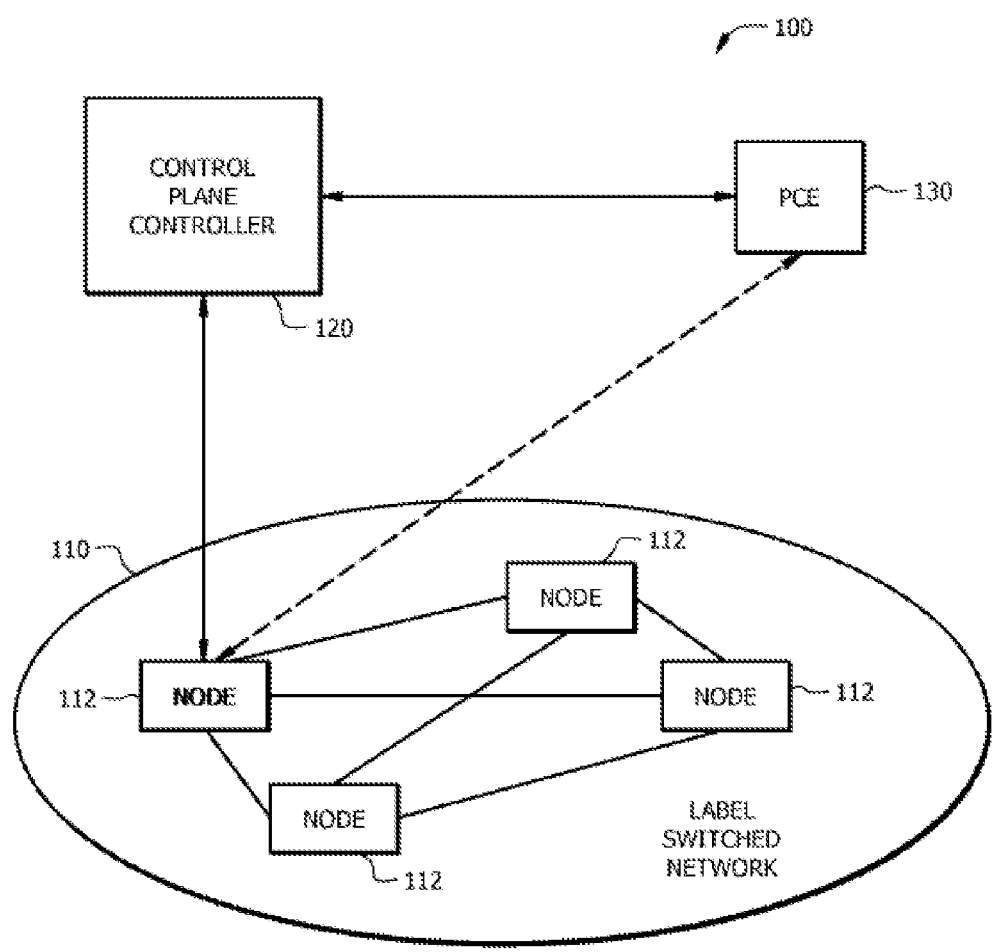
FIG. 1 is a schematic diagram of an embodiment of a label switched network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are mechanisms for transitioning a system from a traditional network to an SDN enabled network. A smooth transition between a traditional network and an SDN enabled network, especially from a cost impact assessment perspective, may be accomplished using existing PCE components from the current network to function as a central controller of the SDN network. Such a choice not only achieves the goal of having a centralized controller to provide the functionalities needed for the central controller, but also leverages the existing PCE network components. The PCE may setup LSPs based on requests from PCCs and may distribute the LSP information via label resource delegation and/or label range negotiation to the LSP path nodes, which may allow for the elimination of Resource Reservation Protocol (RSVP)-TE path setup signaling. The LSP information may be distributed by using PCE Protocol (PCEP), which may allow a PCE to act as a central controller for both SDN nodes and legacy non-SDN nodes. Additional details are included in internet engineering task force (IETF) document draft-zhao-pce-central-controller-use-cases-01, which is incorporated by reference.

Currently the SDN controller is operated based on the Openflow protocol, which is not used in the core network. An SDN is a network technology that addresses customization and optimization concerns within complex networks. SDN architecture allows network administrators to have programmable central control of network traffic without requiring physical access to the network's devices. SDNs may employ Internet Protocol (IP) networks utilizing Transmission Control Protocol/Internet Protocol (TCP/IP). SDNs may decouple the data-forwarding capability, e.g., the data plane, from routing, resource, and other management functionality, e.g., the control plane, previously performed in the network nodes. Decoupling the control plane from the data plane of the network enables the network controller to efficiently control the network traffic through globally optimized traffic engineering and routing, which departs from locally optimized shortest path first (SPF). SDN may also simplify network operations or even have the capabilities to flatten the network with extended data routing vectors.

PCE is a technology already deployed in legacy networks. To migrate a legacy network to SDN network smoothly, methods include using the PCE as the central controller. By using the PCE as the SDN controller, existing Multiprotocol Label Switching (MPLS)/PCE/Interior Gateway Protocol (IGP) mechanisms and associated hardware are employed without requiring a significant change, which may support a transition to a backwards compatible SDN network and allow expensive legacy equipment to be employed as other equipment is replaced. The novel PCE functionalities may include centralized control, network virtualization, simplified protocols through PCEP, and simplification of MPLS network by simplifying and/or eliminating the Label Distribution Protocol (LDP) and the Resource Reservation Protocol (RSVP)-Traffic Engineering (TE) (RSVP-TE) protocols for some or all network nodes.

In SDN, there is no mechanism for setting up a LSP using PCE as a central controller. The disclosed systems, devices, and methods use an existing PCE solution to enable each PCE client and each path node along a calculated LSP to receive the LSP information from the PCE. The operations of a PCE controller include setting up LSPs by communicating LSP information to the head-end node, intermediate nodes, and tail-end node instead of transmitting path information to a PCC/head-end node and requiring the PCC to setup the LSP. This disclosure includes a signaling mechanism compatible with existing PCE servers and/or PCE clients, both for the resource reservation and for the LSP distribution.

The disclosure also includes a mechanism for building a backup P2MP LSP along a point of local repair (PLR), to protect a node and the downstream nodes of the protected node. Additionally, based on the disclosed signaling mechanisms, all the involved nodes may distinguish the primary and secondary paths, thus a dual-feeding method may not be needed. A virtualized network may be provided through multiple topologies, and the primary and secondary LSPs may be identified by different forwarding states, so that all the downstream nodes of the protected node can merge the traffic back to the primary path locally.

FIG. 1 illustrates a schematic diagram of an embodiment of a label switched network 100, where point-to-point (P2P) TE LSPs and P2MP TE LSPs are established between at least some of the components. The label switched network 100 comprises a label switched network 110, a control plane controller 120, and at least one PCE 130. The label switched network 110, the control plane controller 120, and the PCE 130 communicate with each other via optical, electrical, or wireless means.

In an embodiment, the label switched network 110 is a packet switched network, where data traffic is transported using packets or frames along network paths or routes. The packets may be routed or switched along a TE LSP established by a signaling protocol, such as MPLS or Generalized MPLS (GMPLS), based on a path computed by the PCE and/or developed by the nodes 112. The label switched network 110 comprises a plurality of nodes 112 coupled to one another using optical, electrical, or wireless links. The label switch network 110 may also comprise a plurality of domains, such as autonomous system (AS) domains or IGP areas, which may each comprise a set of network elements corresponding to the same address management and/or path computational responsibility. The domains are organized via physical mechanisms (e.g. location, connections, etc.) and/ or logical means mechanisms (e.g. network topology, protocols, communication layers, etc.). The different domains are coupled to each other and each comprise some of the nodes 112.

Nodes 112 are any devices or components that support transportation of the packets through the label switched network 110. For example, the nodes 112 may include bridges, switches, routers, or various combinations of such devices. The nodes 112 comprise a plurality of ingress ports for receiving packets from other nodes 112, logic circuitry that determines which nodes 112 to send the frames to, and a plurality of egress ports for transmitting frames to the other nodes 112. In some embodiments, at least some of the nodes 112 are label switched routers (LSRs), which are configured to modify or update the labels of the packets transported in the label switched network 110. In some embodiments, some of the nodes 112 are label edge routers (LERs). For example, the nodes 112 at the edges of the label switched network 110 are configured to insert or remove the labels of the packets transported between the label switched network 110 and external networks. The first node 112 and the last node 112 along a path are sometimes referred to as the source node or head end node and the destination node or tail end node, respectively. Although four nodes 112 are shown in the label switched network 110, the label switched network 110 may comprise any quantity of nodes 112. Additionally, the nodes 112 may be located in different domains in the label switched network 110 and may be configured to communicate across multiple domains. For example, the nodes 112 that correspond to different domains may exchange packets along a path that is established across multiple domains.

The control plane controller 120 is any device configured to coordinate activities within the label switched network 110, such as a Network Management System (NMS) or Operations Support System (OSS). Specifically, the control plane controller 120 receives routing requests from the label switched network 110 and returns the corresponding path information. In addition, the control plane controller 120 communicates with the PCE 130, for instance using a PCEP, provides the PCE 130 with information used for path computation, receives the computed path from the PCE 130, and forwards the computed path to at least one of the nodes 112. The control plane controller 120 may be located in a component outside of the label switched network 110, such as an external server, or may be located in a component within the label switched network 110, such as a node 112.

The PCE 130 is any device configured to perform all or part of the path computation for the label switched network 110, e.g. based on a path computation request. Specifically, the PCE 130 receives the information that is used for computing a path from the control plane controller 120, from the node 112, or both. The PCE 130 then processes the information to obtain the path. For instance, the PCE 130 computes the path and determines the nodes 112 including the LSRs along the path. The PCE 130 may then send all or part of the computed path information to the control plane controller 120 or directly to at least one node 112. Further, the PCE 130 is typically coupled to or comprises a traffic-engineering database (TED), a P2MP Path database (PDB), a P2P path database, an optical performance monitor (OPM), a physical layer constraint (PLC) information database, or combinations thereof, which may be used to compute the path. The PCE 130 may be located in a component outside of the label switched network 110, such as an external server, or may be located in a component within the label switched network 110, such as a node 112. In an embodiment, a plurality of PCEs 130, which are associated to a plurality of domains in the label switched network 110, perform a distributed path computation across the domains based on a path computation request for an inter-domain P2MP tree, as described in detail below.

A path computation request is sent to the PCE 130 by a PCC. The PCC is any client application requesting a path computation to be performed by the PCE 130. The PCC may also be any network component that makes such a request, such as the control plane controller 120, or any node 112, such as a LSR. For instance, the PCC requests from the PCE a P2MP path or P2P path in a single domain or across multiple domains in the label switched network 110. Additionally, the PCC may send the PCE 130 at least some of the path required information, for example via a PCEP path computation request and/or through broadcast signaling via link state advertisements (LSAs), etc.

Data packets transported between network nodes, such as the nodes 112, are referred to as label switched packets, and comprises labels that are used to switch the packets along the nodes of a computed path. A path computed or given and signaled by MPLS for transporting or routing the label switched packets is referred to as a LSP. For example, the LSP is a TE LSP established using a Resource Reservation Protocol—Traffic Engineering (RSVP-TE). The LSP may be a P2P TE LSP that extends from a source node to a destination node and is unidirectional, where the packets are transported in one direction along the path, e.g., from the source node to the destination node in the label switched network 110. Alternatively, the LSP may be a P2MP TE LSP, which extends from a source or root node to a plurality of destination or leaf nodes. The P2MP TE LSP may be considered as a combination of a plurality of P2P TE LSPs that share the same source node. In some embodiments, the P2MP TE LSP is referred to as a P2MP tree and its P2P TE LSPs are referred to as Source-to-Leaf (S2L) sub-LSPs. The P2MP tree is used to provide multicast services, such as multicast Virtual Private Networks (VPNs), Internet Protocol Television (IPTV), content-rich media distribution, other high-capacity applications, or combinations thereof. Further, the P2MP tree may be an inter-domain P2MP tree, where the source node and the leaf nodes may be distributed across multiple domains, e.g. in the label switched network 110.

Figure 2:
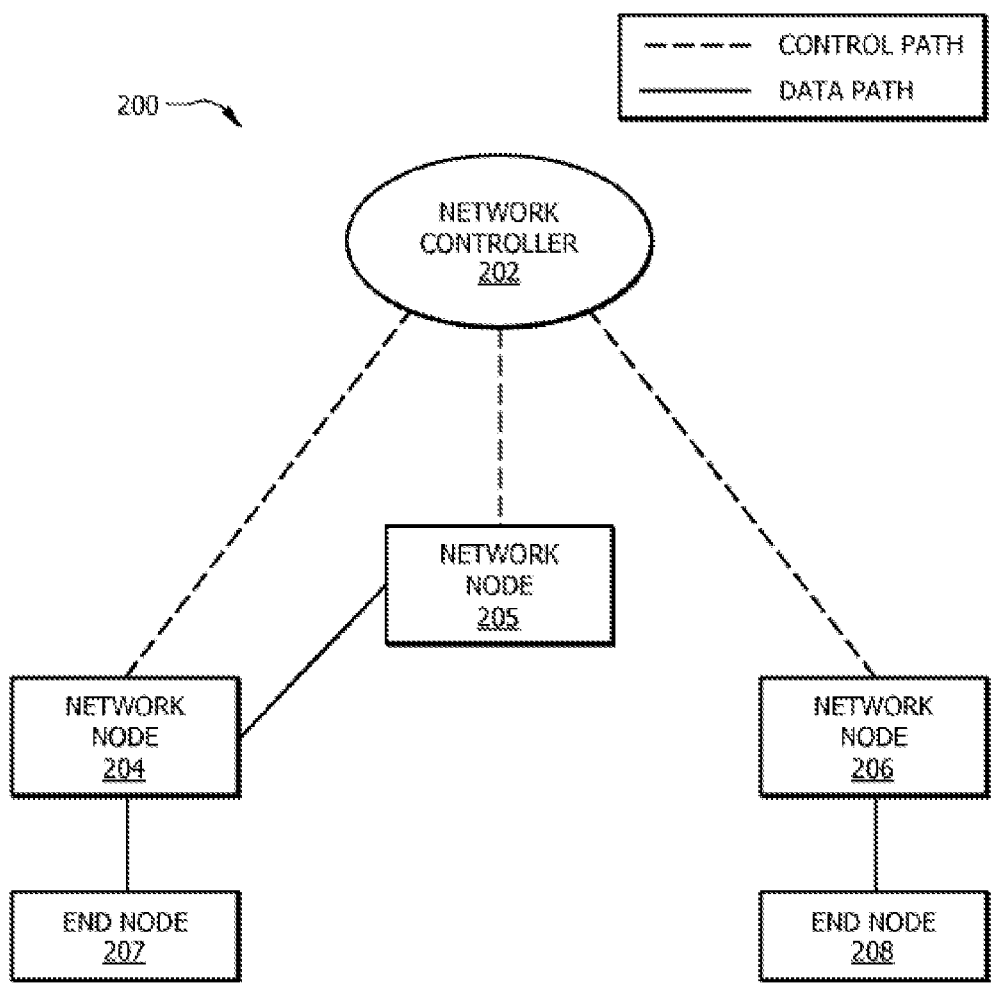
FIG. 2 is a schematic diagram of an embodiment of an SDN network.

FIG. 2 is a schematic diagram of an example embodiment of an SDN network 200. The network 200 comprises a network controller 202, a plurality of network nodes 204, 205, and 206, and a plurality of end nodes 207 and 208. The network nodes 204, 205, and 206 comprise switches, routers, bridges, and/or any other device that is used to receive and/or forward data in a network. The control path is represented by dashed lines and the data path is represented by solid lines. System configuration, management information, and routing/forwarding table information are exchanged between the network controller 202 and the network nodes 204, 205, and 206 via the control path. Data packets are received from end nodes 207-208 and forwarded between network nodes 204, 205, and 206 via the data path. For example, data from end node 207 acting as a publisher are received at network node 204 acting as an Ingress Border Router (IBR), routed through network node 205 acting as a Transit Router (TR), and passed to end node 208 acting as a destination node using network node 206 acting as an Egress Border Router (EBR). As used herein, a border router is a router on the edge of an SDN domain that is connected to at least one node outside of the SDN domain, the IBR is an SDN border router that receives traffic from outside of the SDN domain, and the EBR is an SDN border router that sends traffic outside of the SDN domain. The TR is an SDN router that transports traffic within the SDN domain and has no interfaces connected to outside of the SDN domain. As will be apparent to those of skill in the art, a single border router functions as an IBR, an EBR, or both, depending on traffic flow(s) transported through the LSPs. The end nodes 207-208 are any network elements configured to transmit, receive, originate, and/or terminate data, or, in alternate embodiments, other networks, e.g., IP networks, MPLS networks, etc. In some embodiments, the network controller 202 is a generalized network controller configured to control the network nodes 204-206 and end nodes 207-208. The network controller 202 is any device configured to perform control path and/or control plane functionality, such as creating a network map and defining the information in a routing table that defines how to route incoming packets. The network controller 202 is also configured for management and control functionality of the control plane, which includes routing and resource management. The network nodes 204-206 and end nodes 207-208 include devices that receive and transmit data through the network 200 according to a standard. At least some of the network nodes 204-206 and end nodes 207-208 and network controller 202 conform to a standard, e.g. as defined by Open Networking Foundation (ONF) document OpenFlow Switch Specification version 1.3.4, ONF document Openflow Controller Switch NDM Synchronization version 1.0, and ONF document Software-Defined Networking: The New Norm for Networks, ONF Whitepaper (collectively Openflow), both of which are incorporated by reference.

The network controller 202 receives data from, and transmits messages to, the network nodes 204, 205, and 206. Some of the incoming messages or parts of the incoming messages are translated into a standard independent format for processing by some of the modules in the network controller 202. The standard independent format is based on an abstract network control data model that provides an abstraction of the attributes or features of the various standard formats. The network controller 202 interacts with the network nodes 204, 205, and 206 via a variety of application programming interface (API) protocols, e.g., Openflow. The network controller 202 determines the global network topology of the network 200. With the global network topology, state information, dynamic traffic flow/volume information, and other network state information, the network controller 202 makes decisions on how to assign resources and route applications, information, and/or data packet flows through the network 200.

Figure 3:
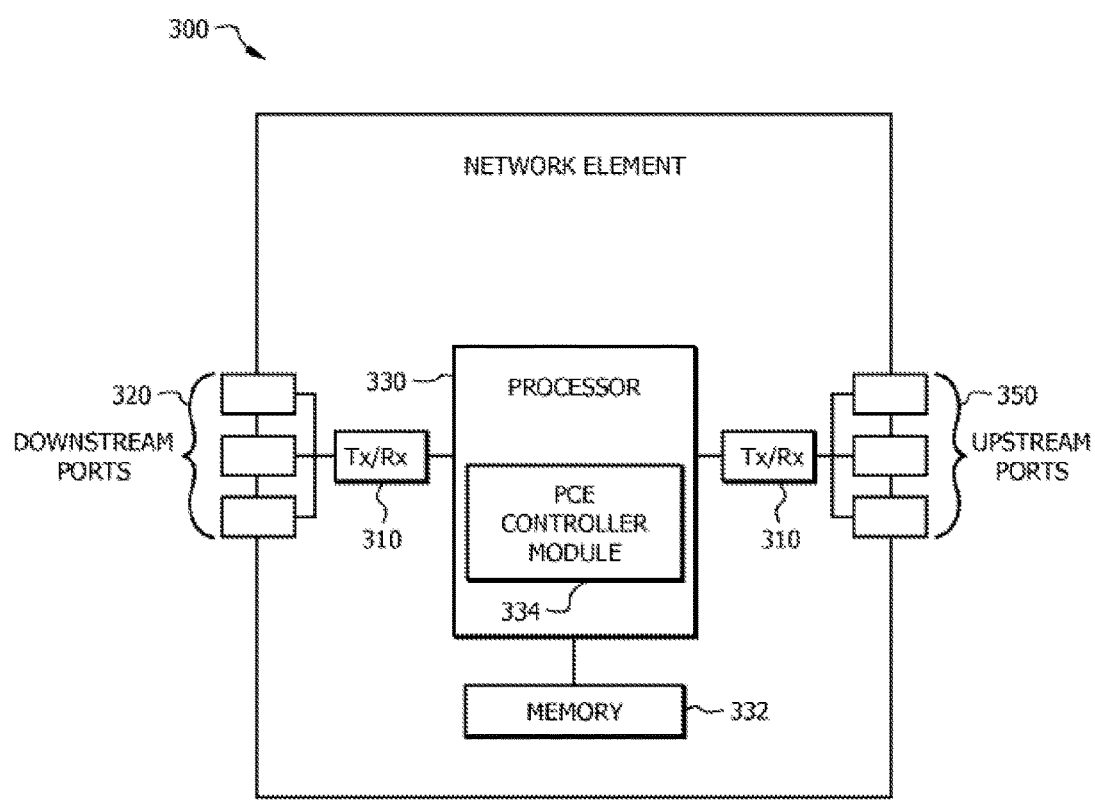
FIG. 3 is a schematic diagram of an embodiment of a network element.

FIG. 3 is a schematic diagram of an example embodiment of a network element (NE) 300, which may implement a control plane controller 120, PCE 130, node 112, a network node 204-207, or network controller 202. In some embodiments, NE 300 also acts as other node(s) depicted in FIGS. 1-2, 4-7, and 9-19 and/or implement all or part of methods disclosed with respect to FIGS. 9-11, 14-19, and/or any other method disclosed herein. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure are implemented in a network node, apparatus, or component such as an NE 300. For instance, the features/methods in the disclosure are implemented using hardware, firmware, and/or software installed to run on hardware. The NE 300 may be any device that transports data, e.g., packets, frames, flows, and/or data streams, through a network, e.g., a switch, router, bridge, server, a client, etc. As shown in FIG. 3, the NE 300 comprises transceivers (Tx/Rx) 310, which are transmitters, receivers, or combinations thereof. A Tx/Rx 310 is coupled to a plurality of downstream ports 320 for transmitting and/or receiving frames from other nodes, and a Tx/Rx 310 is coupled to a plurality of upstream ports 350 for transmitting and/or receiving frames from other nodes, respectively. A processor 330 is coupled to the Tx/Rx 310 to process the frames and/or determine which nodes to which to send frames. The processor 330 may comprise one or more multi-core processors and/or memory modules 332, which functions as data stores, buffers, etc. Processor 330 is implemented as a general processor or is part of one or more application specific integrated circuits (ASICs) and/or digital signal processors (DSPs). Processor 330 comprises a PCE controller module 334, which is configured to provide PCE and SDN functionality as discussed herein and provide functionality to support the methods, computations, and/or communications as described herein. In an alternative embodiment, the PCE controller module 334 is implemented as instructions stored in memory module 332, which are executed by processor 330. The memory module 332 comprises a cache for temporarily storing content, e.g., a Random Access Memory (RAM). Additionally, the memory module 332 comprises a long-term storage for storing content relatively longer, e.g., a Read Only Memory (ROM). For instance, the cache and the long-term storage includes dynamic random access memories (DRAMs), solid-state drives (SSDs), hard disks, or combinations thereof.

It is understood that by programming and/or loading executable instructions onto the NE 300, at least one of the processor 330, the cache, and the long-term storage are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change is preferred to be implemented in software, because re-spinning a hardware implementation is more expensive than re-spinning a software design. Generally, a design that is stable that will be produced in large volume is preferred to be implemented in hardware, for example in an ASIC, because for large production runs the hardware implementation is less expensive than the software implementation. Often a design is developed and tested in a software form and later transformed, by well-known design rules, to an equivalent hardware implementation in an ASIC that hard-wires the instructions of the software. In the same manner as a machine controlled by a new ASIC is a particular machine or apparatus, likewise a computer that has been programmed and/or loaded with executable instructions is viewed as a particular machine or apparatus.

Figure 4:
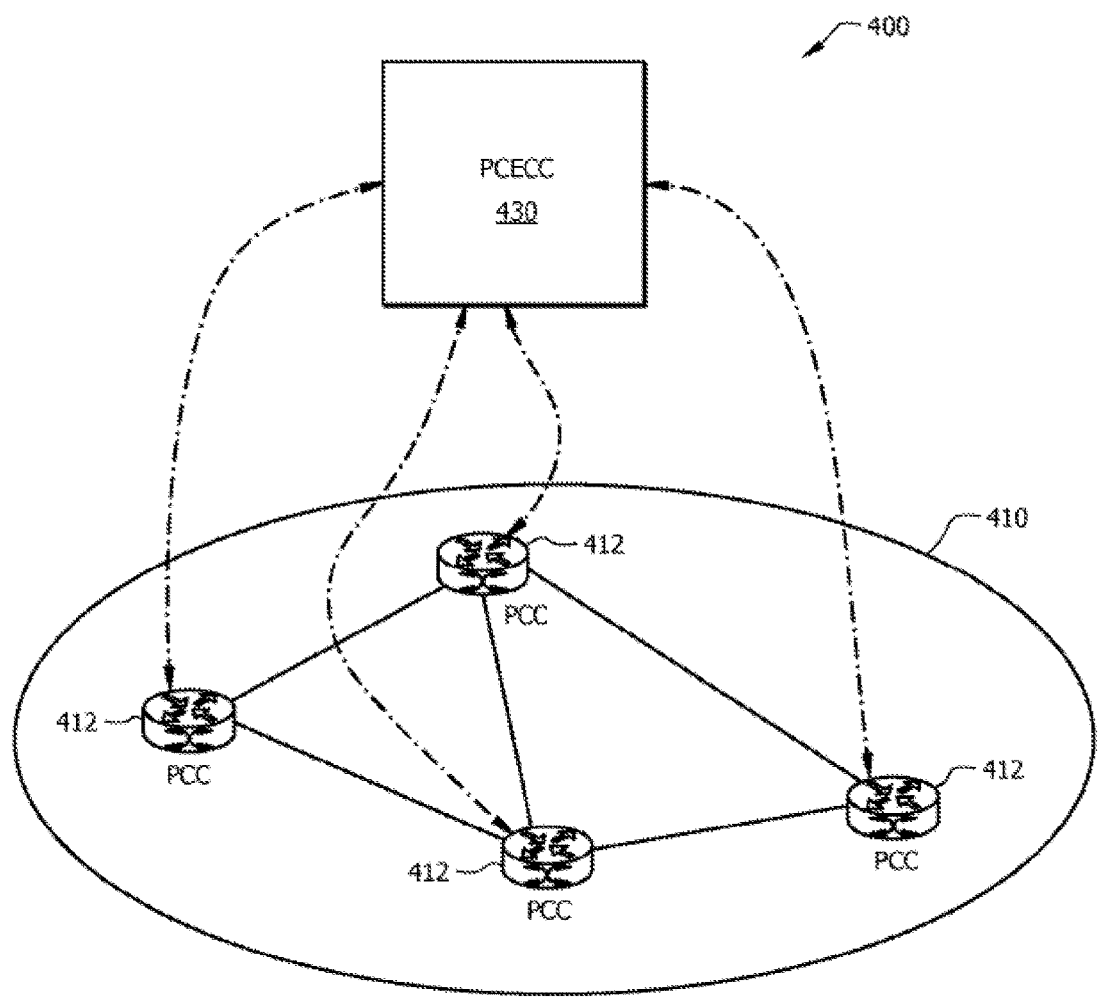
FIG. 4 is a schematic diagram of an embodiment of a label switched network where the PCE acts as a central controller.

FIG. 4 illustrates an embodiment of a label switched network 400 wherein the PCE acts as a central controller for the system 400. The label switched network 400 comprises a label switched network 410 and at least one PCECC 430. The label switched network 410 and the PCECC 430 communicates with each other via optical and/or electrical mechanisms. The PCECC 430 is configured to communicate with a plurality of nodes 412 in the label switched network 410. In some embodiments, the PCECC 430 operates in a similar fashion to the SDN controller 202 described in FIG. 2. The PCECC 430 receives information directly from each node 412 in the label switched network 410, such as path information, network status information, label information, topology information, constraint information, etc. The PCECC 430 also computes pathway control information for each of the nodes 412 and communicates the computed pathway control information to each of the nodes 412. In some embodiments, the PCECC 430 communicates with each of the nodes 412 via PCEP.

In an embodiment, a path computation request is sent to the PCE 130 by a PCC, wherein the PCC may be any client application requesting a path computation to be performed by the PCE 130. The PCC may also be any network component that makes such a request, such as any of the nodes 412. For instance, the PCC requests from the PCECC 430 a P2MP path or P2P path in a single domain or across multiple domains in the label switched network 110. Additionally, the PCC sends the PCECC 430 at least some of the required path information. In the embodiment of FIG. 4, any of the nodes 412 may operate as a PCC by communicating information to the PCECC 430.

After receiving a path computation request, the PCECC 430 processes the information to compute the path. For instance, the PCECC 430 computes the path (e.g. route), and determine the nodes 412 (e.g. LSRs along the path) and/or performs wavelength assignment (WA) in an optical network embodiment. The PCECC 430 then sends all or part of the computed path information directly to each of the nodes 412 along the pathway. For example, the PCE computes routing (R) and/or WA (RWA), assigns labels (e.g. MPLS labels), and determines any other information needed to identify and forward packets through the network. The PCE then forwards such information to each node along the computed/assigned path for storage in a Forwarding Information Base (FIB) or similar structure. The nodes then forward packets according to their corresponding FIBs. In contrast to legacy PCEs, the PCECC 430 is configured to directly communicate/control all nodes along the path and not just the PCC/head-end node. Accordingly, PCECC 430 has no need to employ legacy RSVP-TE functions and/or similar setup signaling along the computed path, which reduces network complexity and control signaling.

Figure 5:
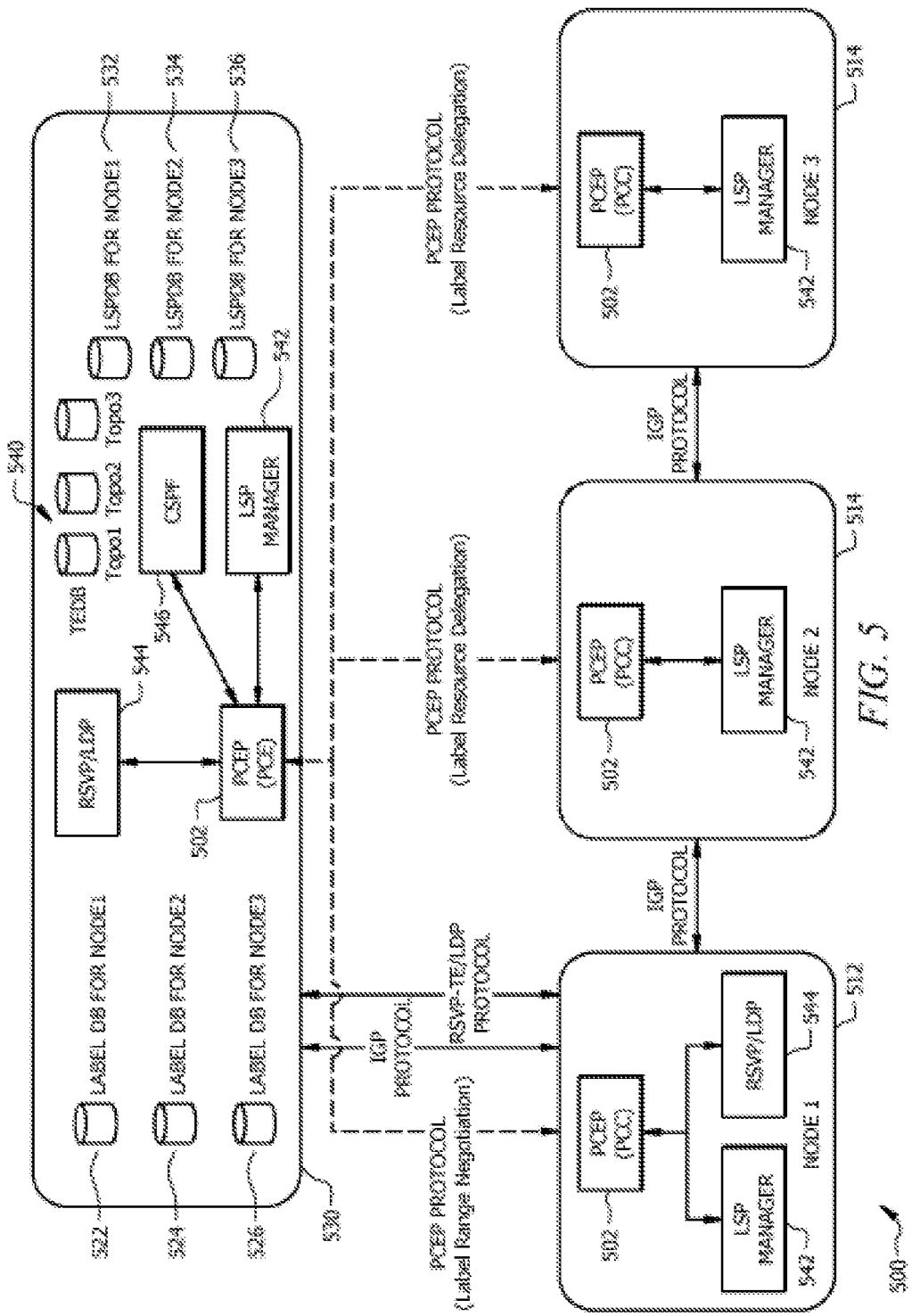
FIG. 5 is a schematic diagram of an embodiment of a network comprising legacy nodes and SDN nodes.

FIG. 5 illustrates an embodiment of a network 500 comprising legacy nodes and SDN nodes. Elements in FIG. 5 may be substantially similar to corresponding elements described in FIG. 4. The embodiment comprises a network 500 for using a PCE 530 as a central controller. PCE 530 and nodes 512 and 514 may be substantially similar to PCECC 430 and nodes 412 respectively. In the network 500, the PCE 530 is operable to communicate with a plurality of nodes 512 and 514, wherein the nodes 512 and 514 comprises a legacy node 512 and at least one SDN node 514, which may be substantially similar to nodes 204-207. In other words, the PCE 530 employs different protocols to communicate with at least two different types of nodes 512 and 514 at the same time. In some embodiments, the PCE 530 communicates with the nodes 512 and 514 via PCEP 502. In some embodiments, the PCE 530 also communicates with the legacy (or non-SDN) node 512 via one or more of IGP, RSVP, and LDP. Additionally, the PCEP modules 502 communicate between the PCE 530 and the legacy node 512 by employing of label range negotiation and/or label resource delegation. Legacy node(s) 512 control their own labels locally, and the PCE 530 obtains locally significant assignment of a label or label ranges from the node(s). The PCE 530 may or may not provide suggested labels to the node(s) 512. The PCE 530 then stores the labels assigned to the legacy node(s) 512 in the associated label database (DB), e.g. label DB 522. In some embodiments, the PCEP 502 communication between the PCE 530 and the one or more SDN nodes 514 comprises the use of label resource delegation. For the SDN nodes, the PCE assigns labels to the SDN nodes 514 (e.g. label resource delegation) and stores the assigned labels in the associated label DBs, e.g. label DB 524 and 526. In an embodiment, the nodes 512 and/or 514 may request that a label and/or a range of labels be reserved by transmitting a path computation label range reservation (PCLRResv) message to the PCE 530. The PCE 530 may reserve the associated labels and/or label range and response with another PCLRResv message.

As shown in FIG. 5, nodes 512 and 514 communicates with each other via an IGP, which may allow the nodes 512 and 514 to determine adjacencies, exchange routing and/or status information, etc. A copy of label databases 522, 524, 526 for each of nodes 512 and 514 (respectively) are stored and accessed by the PCE 530, and are also stored at each node in a FIB or similar structure. The PCE 530 may also maintain LSP databases 532, 534, 536, which may store lightpath information relevant to nodes 512, 514, 516, respectively. For example, label databases 522, 524, 526 may comprise label information and associated port switching information (e.g. node data), while LSP databases 532, 534, 536 may data related to the LSPs traversing an associated link.

In the embodiment shown in FIG. 5, the PCE 530 also comprises Traffic Engineering Database (TEDB) 540 that comprises topology information, link and/or node status information, and similar information that is employed to optimize network performance distributing traffic across the network to avoid congestion, adjusting to link/node failures, etc. Additionally, the PCE 530 and each node 512 and 514 may comprise an LSP manager 542 that is operable to setup, delete, modify, and maintain LSPs and process associated label information. Additionally, the PCE 530 may employ RSVP/LDP components 544 to setup paths and delegate labels for the legacy node 512 via associated protocols as needed. Additionally, the PCE 530 may employ constrained shortest path first (CSPF) module 546 to perform path computations for the LSPs.

Figure 6:
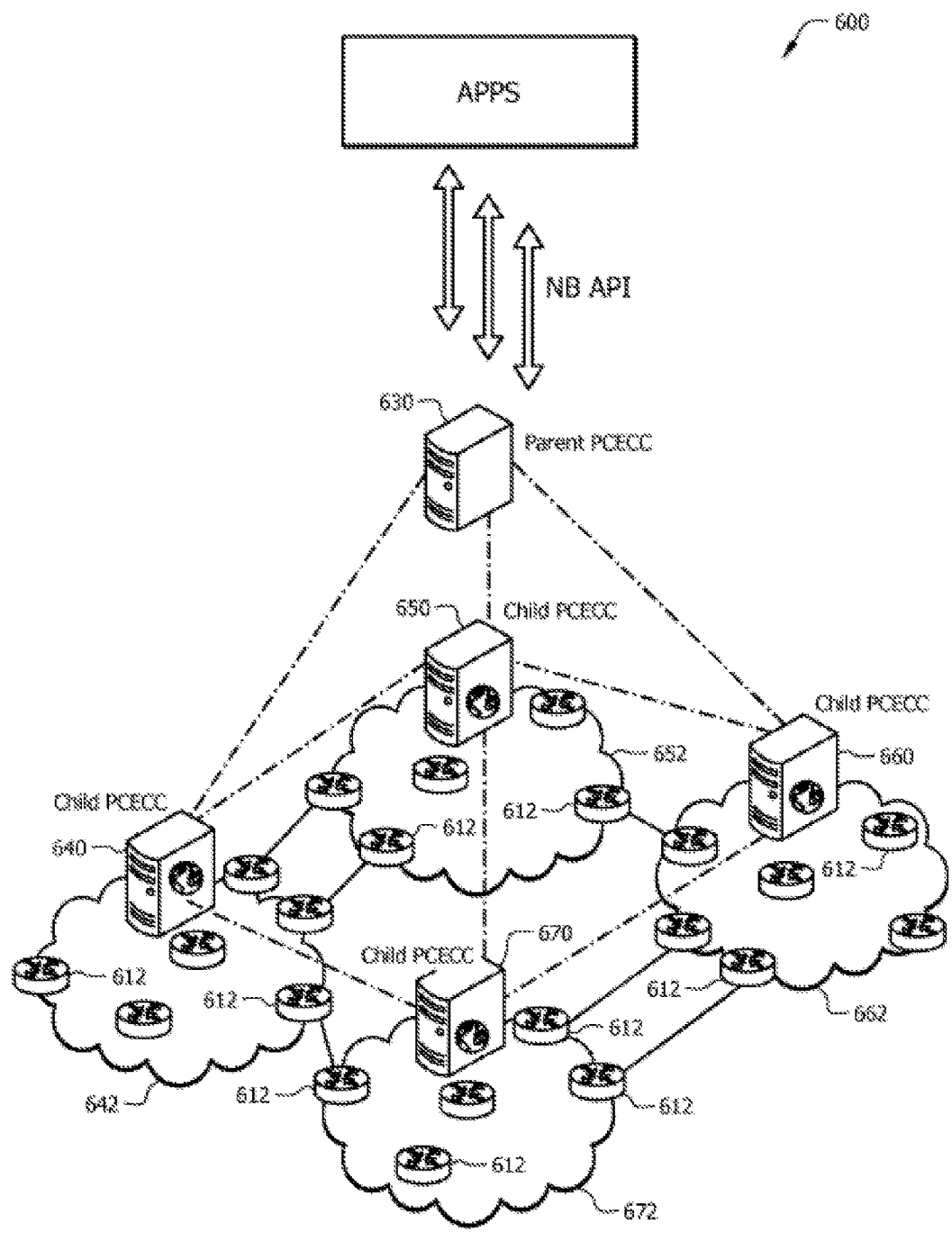
FIG. 6 is a schematic diagram of an embodiment of a use case for a PCE as a central controller (PCECC).

FIG. 6 illustrates an embodiment of a request a LSP from the child PCECC associated with the corresponding network domain (e.g. child PCECC 640 and network domain 642). The child PCECC may then forward the request to the parent PCECC 630. The parent PCECC 630 may compute an optimal route by selecting the domains the LSP should cross and forward a path computation response to the child PCECCs along the LSP (e.g. child PCECCs 640, 650, and 660). The child PCECCs may then compute an optimal path across their respective network domains (e.g. network domains 642, 652, and 662) and communicate pathway control information and associated label information to each of the nodes 612 within their network based on the multi-domain path computed by the parent PCECC 630. The parent PCECC 603 may also communicate with applications in upper open systems interconnection (OSI) layers via a northbound (NB) application program interface (API) as needed.

Figure 7:
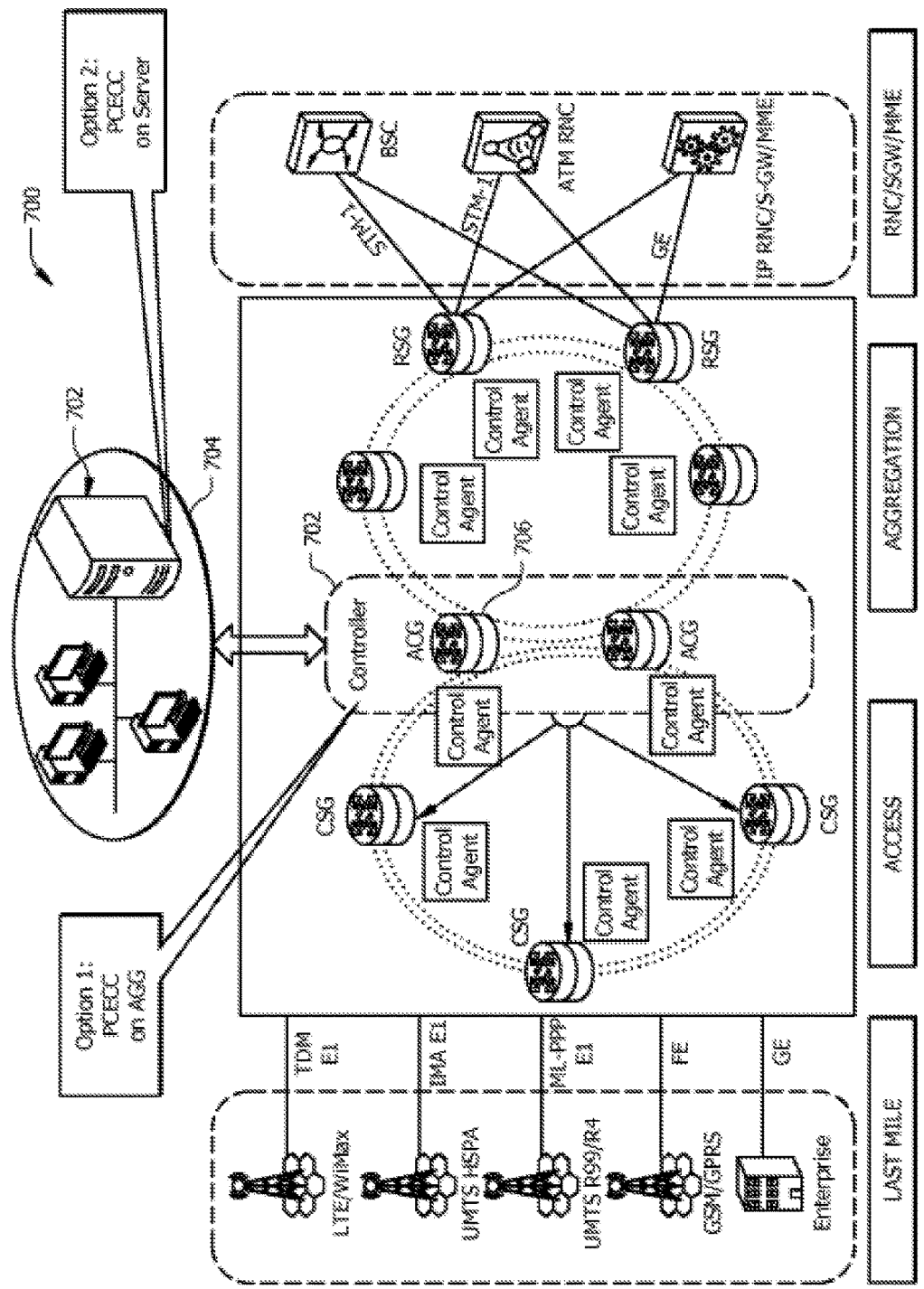
FIG. 7 is a schematic diagram of another embodiment of a use case for a PCECC.

FIG. 7 illustrates another embodiment of a use case example for a PCECC, wherein the PCE controller forwards data through system 700 between at least two domains. Elements in FIG. 7 may be substantially similar to corresponding elements described in FIG. 4. Data may be received local access points geographically distributed in proximity to client device (e.g. last mile) and forwarded to an access network 720. The PCE 702 communicates data between an access network 720 and an aggregation network 722 for further transmission to a core network. In a first embodiment, the PCE 702 operates as a controller located within an Access Control Gateway (ACG) 706 positioned at a border between the access network 720 and the aggregation network 722. In a second embodiment, the PCE 702 manages information transmitted between the access domain 720 and the aggregation domain 722 by controlling one or more ACGs from a server location in a control network 704.

Figure 8:
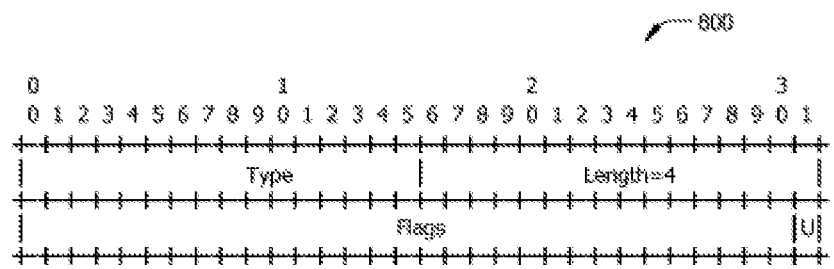
FIG. 8 is a schematic diagram of an embodiment of a PCECC-capability (Type Length Value) TLV encoding.

FIG. 8 is a schematic diagram of an embodiment of a PCECC-capability TLV encoding. Elements in FIG. 8 may be substantially similar to corresponding elements described in FIG. 4. FIG. 8 illustrates an type length value (TLV) 800 object employed in PCEP, to allow for operation of a PCE as a Central Controller (or PCECC). The PCECC-capability TLV is an optional TLV may be used for PCECC capability advertisement. The TLV object comprises a type field, which is sixteen bits long and indicates the type of the object, a length field which is sixteen bits long and indicates the length of the object, and a flags field which is thirty two bits long and indicates advertisement data including data indicate the PCE is capable of acting as a PCECC. The flags field comprises an update (U) flag which is one bit long and is set to indicate the TLV object comprises an update from a previous advertisement.

Figure 9:
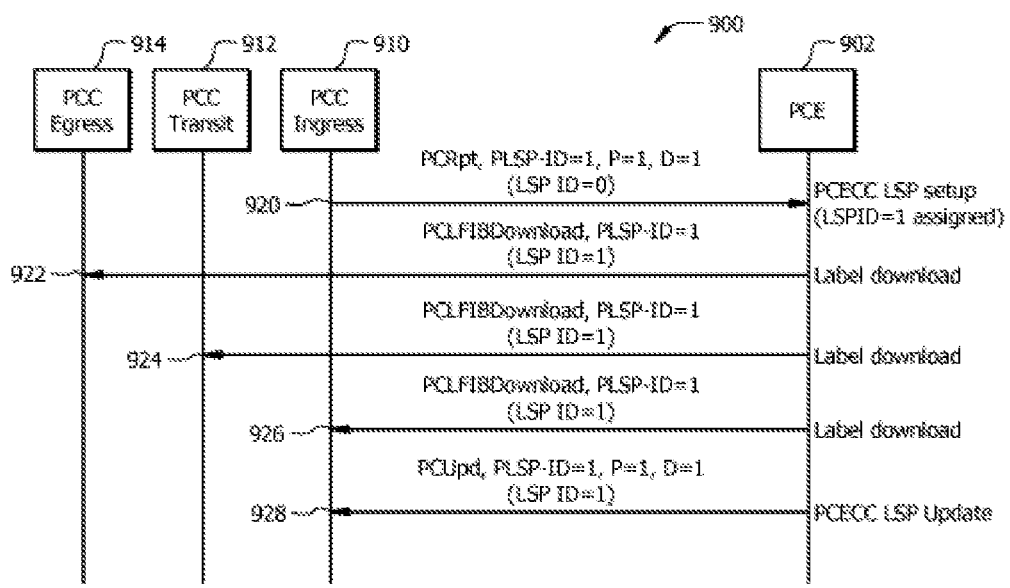
FIG. 9 is a schematic diagram of an embodiment of a method of PCC initiated PCECC LSP set up.

FIG. 9 is a schematic diagram of an embodiment of a method 900 of PCC initiated PCECC LSP setup. Elements in FIG. 9 may be substantially similar to corresponding elements described in FIG. 4. FIG. 9 illustrates a method 900 for PCC initiated LSP setup when a PCE 902 acts as a central controller. In a first step, the PCE 902 receives a path computation state report (PCRpt) message 920 from the PCC Ingress 910 node requesting setup of an LSP. The PCRpt) message 920 comprises a PCC initiated LSP ID indicating an identifier (ID) for the LSP assigned by the PCC, a PCECC (P) flag set to indicate that the associated LSP is to be created, maintained, and/or deleted by employing a PECC solution, and a delegation (D) flag set to indicate that control of the LSP is to be delegated to the PCE. In an alternative embodiment, the message 920 is a path computation initiate (PCInitiate) message. Then, the PCE 902 assigns an LSP ID to the LSP (e.g. 1) based on the LSP setup request message 920, and sends path computation label forwarding information base download (PCLFIBDownload) messages 922, 924, and 926 to a PCC egress 914, transit 912, and ingress 910, respectively. Messages 922, 924, and 926 may inform the nodes along the path of the assigned LSP ID, a correlation with the PSLP ID, and the label information needed to route the data packet. The, PCE 902 sends path computation update (PCUpd) message 928 to the PCC Ingress 910, from which the LSP setup request message 920 was received by the PCE 902. Message 928 informs the Ingress 910 that the path setup is complete. As illustrated, the PCE 902 communicates directly with each PCC 910, 912, and 914 in the pathway to set up the LSP.

Figure 10:
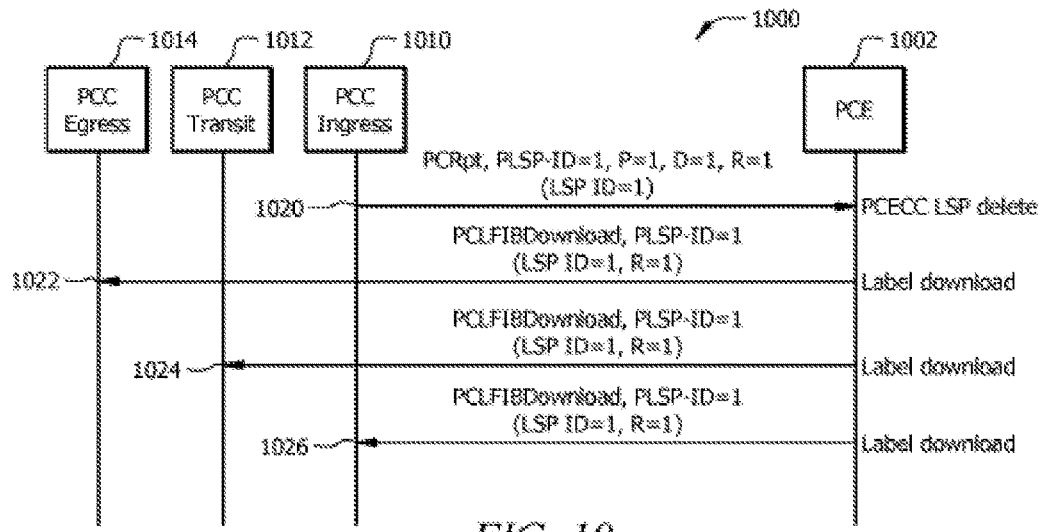
FIG. 10 is a schematic diagram of an embodiment of a method of PCC initiated PCECC LSP delete.

FIG. 10 is a schematic diagram of an embodiment of a method 1000 for PCC initiated PCECC LSP delete. Elements in FIG. 10 may be substantially similar to corresponding elements described in FIG. 4. FIG. 10 illustrates a method 1000 for a PCC Ingress 1010 initiated operation of an LSP deletion by a PCE 1002 acting as a central controller. In a first step, the PCE 1002 receives a PCRpt message 1020 from the PCC Ingress 1010 node indicating an LSP ID and comprising a reason (R) code set to indicate the LSP should be deleted. Then, the PCE 1002 sends PCLFIBDownload messages 1022, 1024, and 1026 to the PCC Egress 1014 node, the PCC Transit 1012 node, and the PCC Ingress 1010 node, respectively, indicating the LSP ID of the LSP to be deleted and R code indicating the deletion operation. The associated nodes then delete the LSP indicated by the LSP ID and associated label information. As such, the PCLFIBDownloadmessage may be used to clean up an LSP. As illustrated, the PCE 1002 communicates directly with each node 1010, 1012, and 1014 in the pathway to delete the LSP.

Figure 11:
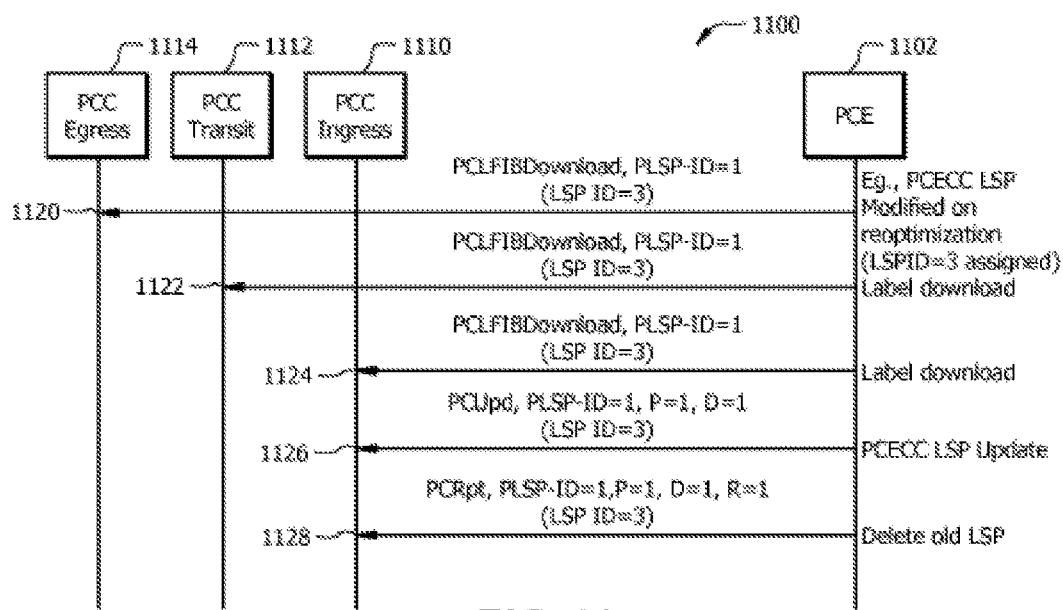
FIG. 11 is a schematic diagram of an embodiment of a method of PCC initiated PCECC LSP update.

FIG. 11 is a schematic diagram of an embodiment of a method 1100 of PCC initiated PCECC LSP update. Elements in FIG. 11 may be substantially similar to corresponding elements described in FIG. 4. FIG. 11 illustrates a method 1100 for PCC 1110 initiated LSP update when a PCE 1102 acts as a central controller. In a first step, the PCE 1102 reassigns the LSP ID (for example to 3 instead of 1) when the LSP has been modified due to a network/path related re-optimization (e.g. based on a change in network conditions). The PCE 1102 sends a PCLFIBDownloadmessage 1120, 1122, and 1124 to the PCC Egress 1114 node, PCC Transit 1112 node, and the PCC Ingress 1110 node, respectively, indicating the old LSP ID should be updated to the new LSP ID. Messages 1120, 1122, and 1124 may contain additional label information as needed. The PCE 1102 also sends a PCUpd message 1126 to the PCC Ingress 1110 node to update LSP information associated with the new LSP ID. The PCE 1102 then deletes the old LSP by sending PCRpt 1128 identifying the old LSP ID and supplying an R code to indicate a deletion. Accordingly, the old LSP is deleted so that the new (e.g. modified) LSP is used. Messages 1126 and 1128 may be transmitted to all affected nodes in some embodiments. As illustrated, the PCE 1102 communicates directly with each PCC 1110, 1112, and 1114 in the pathway to update an LSP.

As discussed above, in certain networks deployment scenarios service providers would like to keep all the existing MPLS functionalities in both MPLS and GMPLS network while removing the complexity of existing signaling protocols such as LDP and RSVP-TE. This document discloses the use of the PCE as a central controller so that LSP can be calculated/signaled/initiated/downloaded/managed through a centralized PCE server to each network devices along the LSP path while leveraging the existing PCE technologies as much as possible.

This document also describes the use cases for using the PCE as the central controller where LSPs are calculated/setup/initiated/downloaded/maintained through extending the current PCE architectures and extending the PCEP.

In certain network deployment scenarios, service providers would like to have the ability to dynamically adapt to a wide range of customer's requests for the sake of flexible network service delivery, SDN provides additional flexibility in how the network is operated comparing the traditional network. The existing networking ecosystem has become complex and highly demanding in terms of robustness, performance, scalability, flexibility, agility, etc. By migrating to the SDN enabled network from the existing network, service providers and network operators must have a solution which they can evolve easily from the existing network into the SDN enabled network while keeping the network services scalable, guarantee robustness and availability, etc. Taking the smooth transition between traditional network and the SDN enabled network into account, especially from a cost impact assessment perspective, using the existing PCE components from the current network to function as the central controller of the SDN network is one choice, which not only achieves the goal of having a centralized controller to provide the functionalities needed for the central controller, but also leverages the existing PCE network components.

The PCEP provides mechanisms for PCEs to perform route computations in response to PCCs requests. PCEP can be used to enable active control of MPLS-TE and GMPLS tunnels. PCE-initiated setup and teardown of LSPs under the active stateful PCE model may be performed without the need for local configuration on the PCC, thus allowing for a dynamic MPLS network that is centrally controlled and deployed. Addressing the requirements for SR technology leverages the source routing and tunneling paradigms such as remote-initiated GMPLS LSPs. A source node can choose a path without relying on hop-by-hop signaling protocols such as LDP or RSVP-TE. Each path is specified as a set of segments advertised by link-state routing protocol (e.g. Intermediate Source to Intermediate Source (IS-IS) or Open Shortest Path First (OSPF)). A Segment Routed path (SR path) can be derived from an IGP Shortest Path Tree (SPT). Segment Routed Traffic Engineering paths (SR-TE paths) may not follow IGP SPT. Such paths may be chosen by a suitable network planning tool and provisioned on the source node of the SR-TE path. It is possible to use a stateful PCE for computing one or more SR-TE paths taking into account various constraints and objective functions. Once a path is chosen, the stateful PCE can instantiate an SR-TE path on a PCC using PCEP and SR specific PCEP extensions. By using the solutions provided herein, LSPs in both MPLS and GMPLS networks can be setup/deleted/maintained/synchronized through a centrally controlled dynamic MPLS network. Since in these solutions, the LSP is signaled through the head end LER to the tail end LER, either RSVP-TE signaling protocol should be deployed in the MPLS/GMPLS network, or TGP protocol should be extended with node/adjacency segment identifiers signaling capability to be deployed.

Figure 12:
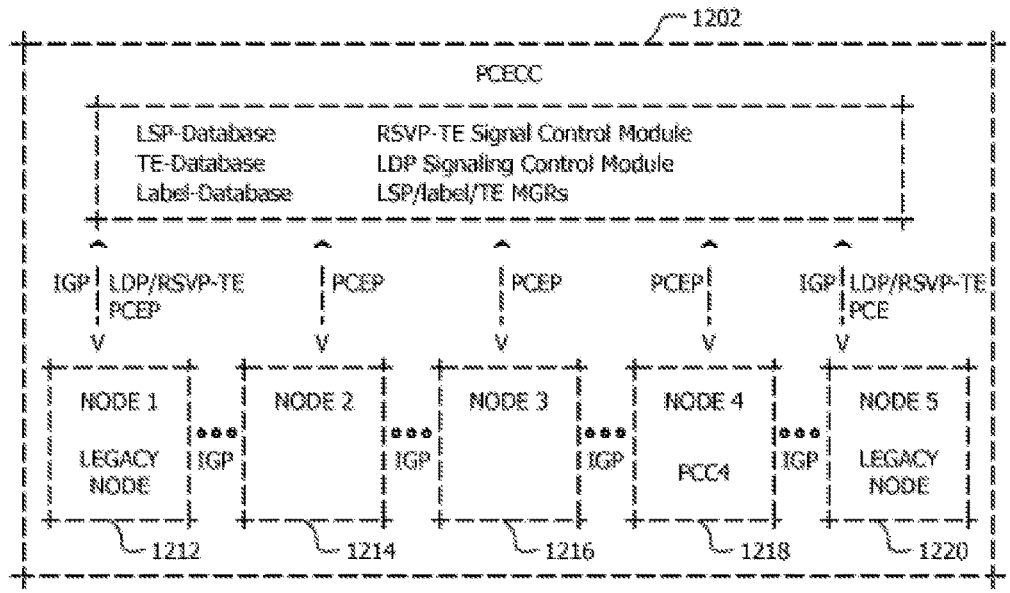
FIG. 12 is a schematic diagram of an embodiment of a PCECC architecture.

FIG. 12 is a schematic diagram of an embodiment of a PCECC architecture 1202. Elements in FIG. 12 may be substantially similar to corresponding elements described in FIG. 4. As shown in FIG. 12, the PCECC solution proposed in this document allow for a dynamic MPLS network that is controlled and deployed without the deployment of RSVP-TE protocol or extended IGP protocol with node/adjacency segment identifiers signaling capability while providing all the key MPLS functionalities needed by the service providers. These key MPLS features include MPLS P2P LSP, P2MP/MP2MP LSP, MPLS protection mechanism etc. In the case that one LSP path consists of legacy network nodes 1212, 1220 and the new network nodes 1214, 1216, 1218 which are centrally controlled, the PCECC solution provides a smooth transition step for users.

Some embodiments include using the PCE as the Central Controller. PCECC may not only remove the existing MPLS signaling totally from the control plane without losing any existing MPLS functionalities, but also PCECC achieves this goal through utilizing existing PCEP without introducing a new protocol into the network. FIG. 12 illustrates the PCECC architecture.

The combination of the functionality for global label range signaling and the functionality of LSP setup/download/cleanup using the combination of global labels and local labels is referred to herein as PCECC functionality. A current MPLS label has local meaning. That is, MPLS labels are allocated locally and signaled through LDP/RSVP-TE/BGP etc. dynamic signaling protocols. As SDN technology develops, MPLS global label has been proposed. MPLS global labels can be used for identification of the location, the service and the network in different application scenarios. From these use cases, it can be seen that no matter SDN or traditional application scenarios, solutions based on MPLS global label have an advantage over the existing solutions to facilitate service provisions.

To ease the label allocation and signaling mechanism, e.g. with applications such as concentrated LSP controller being introduced, a PCE can be conveniently used as a central controller and MPLS global label range negotiator.

For example, PCE server and PCE clients may be configured to have the global label range negotiation and local label range negotiation functionality. To empower networking with centralized controllable modules, there are many choices for downloading the forwarding entries to the data plane, one way is the use of the OpenFlow protocol, which helps devices populate their forwarding tables according to a set of instructions to the data plane. There are other candidate protocols to convey specific configuration information towards devices also. Since the PCEP protocol is deployed in some of the service network, it may be leveraged to populate the MPLS forwarding table. For the centralized network, the performance achieved through a distributed system cannot be easily matched if the entire forwarding path is computed, downloaded and maintained by the centralized controller. The performance can be improved by supporting part of the forwarding path in the PCECC network through the segment routing mechanism except that the adjacency IDs for all the network nodes and links are propagated through the centralized controller instead of using the IGP extension. The node and link adjacency IDs can be negotiated through the PCECC with each PCECC clients and these IDs can be taken from the global label range which has been negotiated. With the capability of supporting SR within the PCECC architecture, P2P forwarding path protection is supported within the PCECC network. These protection alternatives include end-to-end path protection, local protection without operator management and local protection with operator management. With the capability of global label and local label existing at the same time in the PCECC network, PCECC computes, performs setup, and maintains the P2MP and MP2MP LSP using the local label range for each network nodes. With the capability of setting up/maintaining the P2MP/MP2MP LSP within the PCECC network, end-end managed path protection service and the local protection are provided with the operation management in the PCECC network for the P2MP/MP2MP LSP, which includes both the RSVP-TE P2MP based LSP and also the multicast label distribution protocol (mLDP) based LSP.

PCE clients as discussed herein have the capability to advertise PCECC capability to the PCECC. PCEs as discussed herein have the capability to negotiate a global label range for a group of clients. PCCs discussed herein are able ask for global label range assigned in path request message. PCEs may not be required to support label reserve service. Therefore, a PCE may reject a Path Computation Request message with a reason code that indicates no support for label reserve service. PCEP provides a mechanism to return global label range and LSP label assignments of the computed path in a reply message. PCEP provides a mechanism to download the MPLS forwarding entry to the PCECC's clients.

Figure 13:
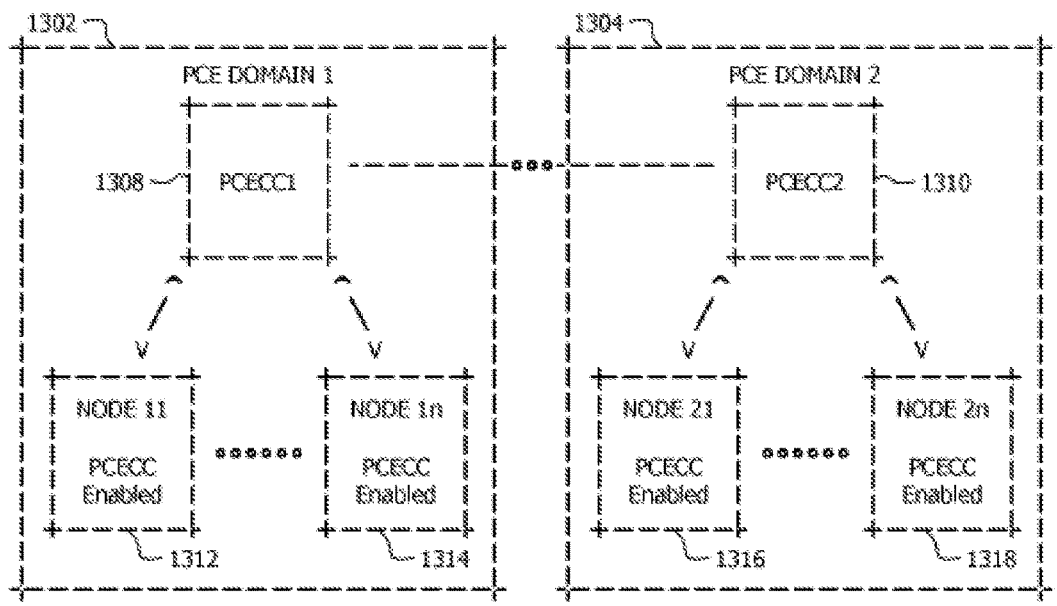
FIG. 13 is a schematic diagram of an embodiment of a PCECC architecture for global label allocation.

FIG. 13 is a schematic diagram of an embodiment of a PCECC architecture for global label allocation. Elements in FIG. 13 may be substantially similar to corresponding elements described in FIG. 4. The following examples are based on network configurations illustrated using FIG. 13.

Example 1 comprises Shared Global Label Range Reservation, wherein PCECC Clients nodes report MPLS label capability to the central controller PCECC. The central controller PCECC collects MPLS label capability of all nodes. Then PCECC can calculate the shared MPLS global label range for all the PCECC client nodes. In the case that the shared global label range needs to be negotiated across multiple domains 1302 and 1304, the central controllers 1308 and 1310 of these domains are communicated to negotiate a common global label range. The central controller PCECC notifies the shared global label range to all PCECC client nodes.

Example 2 comprises Global Label Allocation, wherein PCECC Client node11 1312 sends a global label allocation request to the central controller PCECC1 1308. The central controller PCECC1 1308 allocates the global label for Forward Error Correction (FEC)1 channel from the shared global label range and sends the reply to the client node11 1312. The central controller PCECC1 1308 notifies the allocated label for FEC1 to all PCECC client nodes within PCE domain 1 1302.

Figure 14:
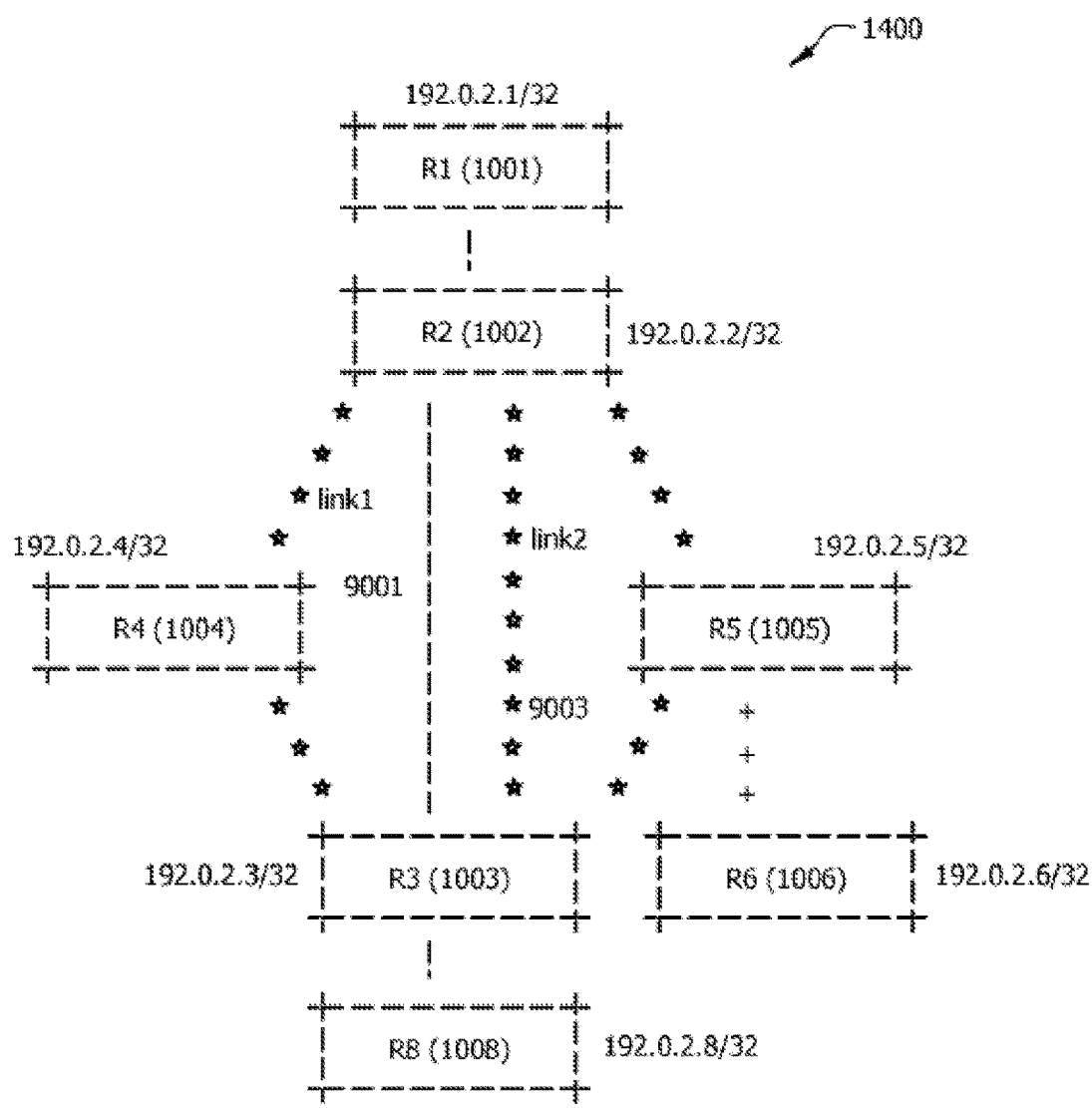
FIG. 14 is a schematic diagram of an embodiment of a method of using PCECC to manage Source Routing (SR) paths.

FIG. 14 is a schematic diagram of an embodiment of a method of using PCECC to manage SR paths 1400. Elements in FIG. 14 may be substantially similar to corresponding elements described in FIG. 4. Some embodiments include using PCECC for SR without the IGP extension. Referring to FIG. 14, for the centralized network, the performance achieved through distributed system cannot be easily matched if the entire forwarding path is computed, downloaded and maintained by the centralized controller. The performance can be improved by supporting part of the forwarding path in the PCECC network through the segment routing mechanism except that node segment IDs and adjacency segment IDs for all the network are allocated dynamically and propagated through the centralized controller instead of using the IGP extension. When the PCECC is used for the distribution of the node segment ID and adjacency segment ID, the node segment ID is allocated from the global label pool. The adjacency segment ID may be allocated from the local label pool or from the global label pool. The advantage for the global label pool is that the depth of the label stack for the forwarding path encoding will be reduced since adjacency segment ID can signal the forwarding path without adding the node segment ID in front of it. When PCECC is used as the central controller, the support of fast reroute (FRR) on any topology can be pre-computed and setup without any additional signaling (other than the regular IGP/Border Gateway Protocol (BGP) protocols) including the support of shared risk constraints, support of node and link protection and support of microloop avoidance. The following examples illustrate the use case where the node segment ID and adjacency segment ID are allocated from the global label allocated for SR path.

Examples include use cases of PCECC for SR Best Effort (BE) Path. In this mode of the solution, the PCECC allocates the node segment ID and adjacency ID without calculating the explicit path for the SR path. The ingress of the forwarding path encapsulates the destination node segment ID on top of the packet. All the intermediate nodes forward the packet based on the final destination node segment ID. It is similar to the LDP LSP forwarding except that label swapping is using the same global label both for the in segment and out segment in each hop. The p2p SR BE path examples are explained as bellow: Note that the node segment IDs for each node from the shared global labels ranges are also negotiated.

Example 1: R1 may send a packet to R8 by pushing an SR header with segment list {1008}. The path can be: R1-R2-R3-R8 or R1-R2-R5-R8 depending on the route calculation on node R2.

Example 2 comprises local link/node protection. For the packet which has a destination of R3, R2 may be preinstalled as a backup forwarding entry to protect the R4 node. The preinstalled the backup path can go through either node5 or link1 or link2 between R2 and R3. The backup path calculation is locally decided by R2 and any IP FRR algorithms can be used.

Examples also include use cases of PCECC for SR Traffic Engineering (TE) Path. When a traffic engineering path is needed, the PCECC allocates the node segment ID and adjacency ID, calculates the explicit path for the SR path, and passes this explicit path represented with a sequence of node segment ID and adjacency id. The ingress of the forwarding path encapsulates the stack of node segment ID and adjacency ID on top of the packet. For the case where strict traffic engineering path is needed, all the intermediate nodes and links are specified through the stack of labels so that the packet is forwarded exactly as assigned. Even though it is similar to TE LSP forwarding where forwarding path is engineered, Quality of Service (QoS) is only guaranteed through the enforcement of bandwidth admission control. As for the RSVP-TE LSP case, Qos is guaranteed through the link bandwidth reservation in each hop of the forwarding path. The P2P SR traffic engineering path examples are explained as below: Note that the node segment ID for each node is allocated from the shared global labels ranges are negotiated and adjacency segment ids for each link are allocated from the local label pool for each node.

Example 1: R1 may send a packet P1 to R8 by pushing an SR header with segment list {1008}. The path would be R1-R2-R3-R8.

Example 2: R1 may send a packet P2 to R8 by pushing an SR header with segment list {1002, 9001, 1008}. The path would be R1-R2-(1)link-R3-R8.

Example 3: R1 may send a packet P3 to R8 while avoiding the links between R2 and R3 by pushing an SR header with segment list {1004, 1008}. The path should be: R1-R2-R4-R3-R8

The P2P local protection examples for SR TE path are explained as below:

Example 4: local link protection: R1 sends a packet P4 to R8 by pushing an SR header with segment list {1002, 9001, 1008}. The path should be: R1-R2-(1)link-R3-R8. When node R2 receives the packet from R1 which has the header of R2-(1)link-R3-R8, and finds out there is a link failure of link1, then it will send out the packet with header of R3-R8 through link2.

Example 5: local node protection: R1 may send a packet P5 to R8 by pushing an SR header with segment list {1004, 1008}. The path should be: R1-R2-R4-R3-R8. When node R2 receives the packet from R1 which has the header of {1004, 1008}, and also find out there is a node failure for node4, then it will send out the packet with header of {1005, 1008} to node5 instead of node4.

Some embodiments may comprise use cases of PCECC for TE LSP. In the previous sections, we have discussed the cases where the SR path is setup through the PCECC. Although those cases give the simplicity and scalability, there are existing functionalities for the traffic engineering path such as the bandwidth guarantee through the full forwarding path and the multicast forwarding path which SR based solution cannot solve. Also there are cases where the depth of the label stack may have been an issue for existing deployment and certain vendors.

Figure 15:
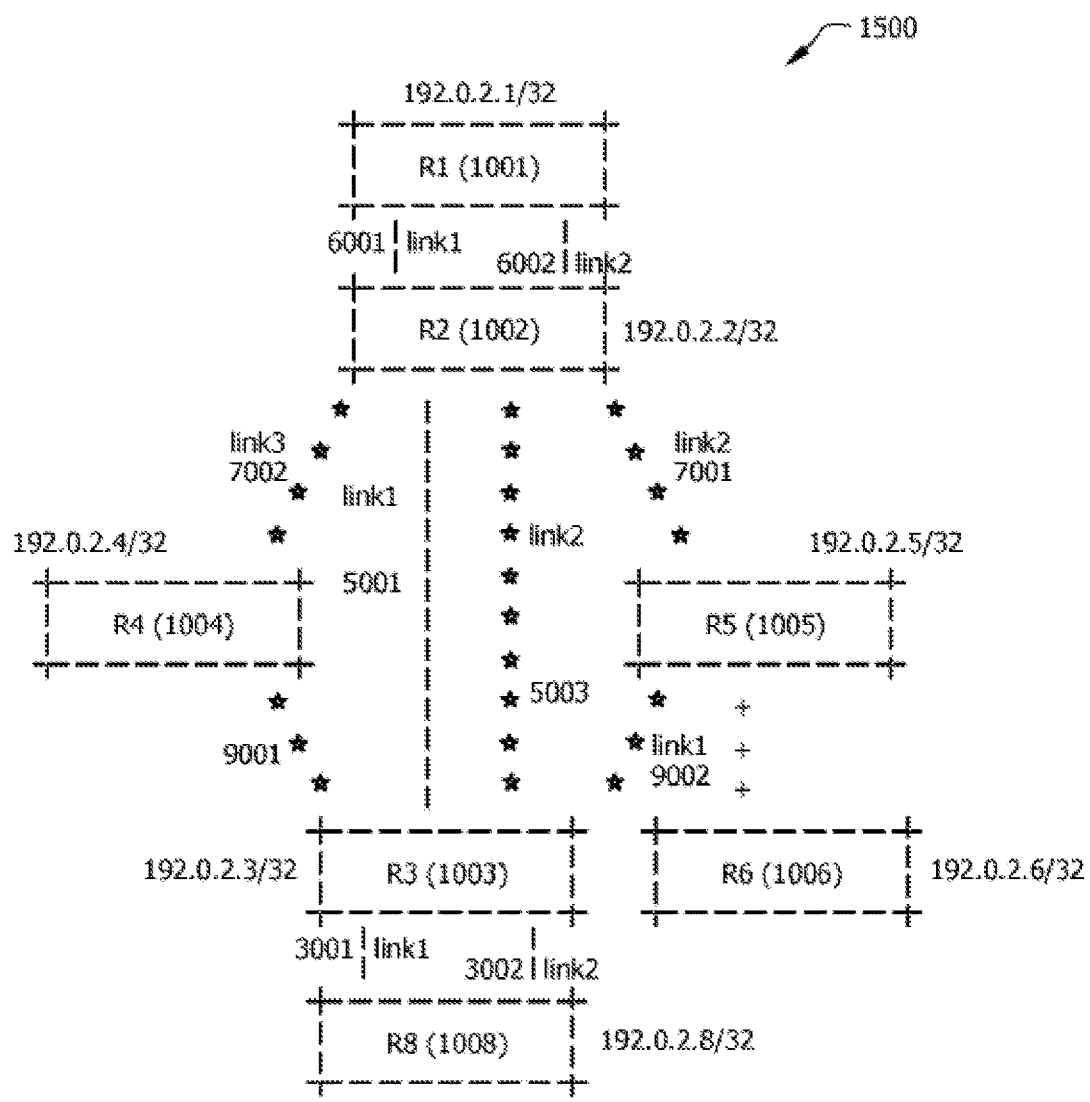
FIG. 15 is a schematic diagram of an embodiment of a method of using PCECC to manage Traffic Engineering (TE) LSP.

FIG. 15 is a schematic diagram of an embodiment of a method 1500 of using PCECC to manage TE LSP. Elements in FIG. 15 may be substantially similar to corresponding elements described in FIG. 4. To address the issues described above, PCECC architecture may also support the TE LSP and multicast LSP functionalities, as illustrated in FIG. 15. To achieve this, the existing PCEP can be used to communicate between the PCE server and PCE's client PCC for exchanging the path request and reply information regarding to the TE LSP info. In this case, the TE LSP information is not only the path information itself, but it includes the full forwarding info. Instead of letting the ingress of LSP initiate the LSP setup through the RSVP-TE signaling protocol, with minor extensions PCEP is used to download the complete TE LSP forwarding entries for each node in the network.

Examples include TE LSP Setup, wherein Node1 sends a path request message for the setup of TE LSP from R1 to R8. PCECC programs each node along the path from R1 to R8 with the primary path: {R1, link1, 6001}, {R2, link3, 7002], {R4, link0, 9001}, {R3, link1, 3001}, {R8}. For the end to end protection, PCECC program each node along the path from R1 to R8 with the secondary path: {R1, link2, 6002}, {R2, link4, 7001], {R5, link1, 9002}, {R3, link2, 3002}, {R8}. It is also possible to have a secondary backup path for the local node protection setup by PCECC. For example, if the primary path is the same as setup above, then to protect the node R4 locally, PCECC can program the secondary path as: {R1, link1, 6001}, {R2, link1, 5001}, {R3, link1, 3001}, {R8}. By doing this, the node R4 is locally protected.

The multicast LSPs are setup either using the RSVP-TE P2MP or mLDP protocols. The setup of these LSPs not only needs manual configurations, but also requires complex protection schemes. By using the PCECC solution, the multicast LSP can be computed and setup through centralized controller which has the full picture of the topology and bandwidth usage for each link. It not only reduces the complex configurations compared to the distributed RSVP-TE P2MP or mLDP signaling, but also supports computation of disjoint primary paths and secondary paths efficiently.

Figure 16:
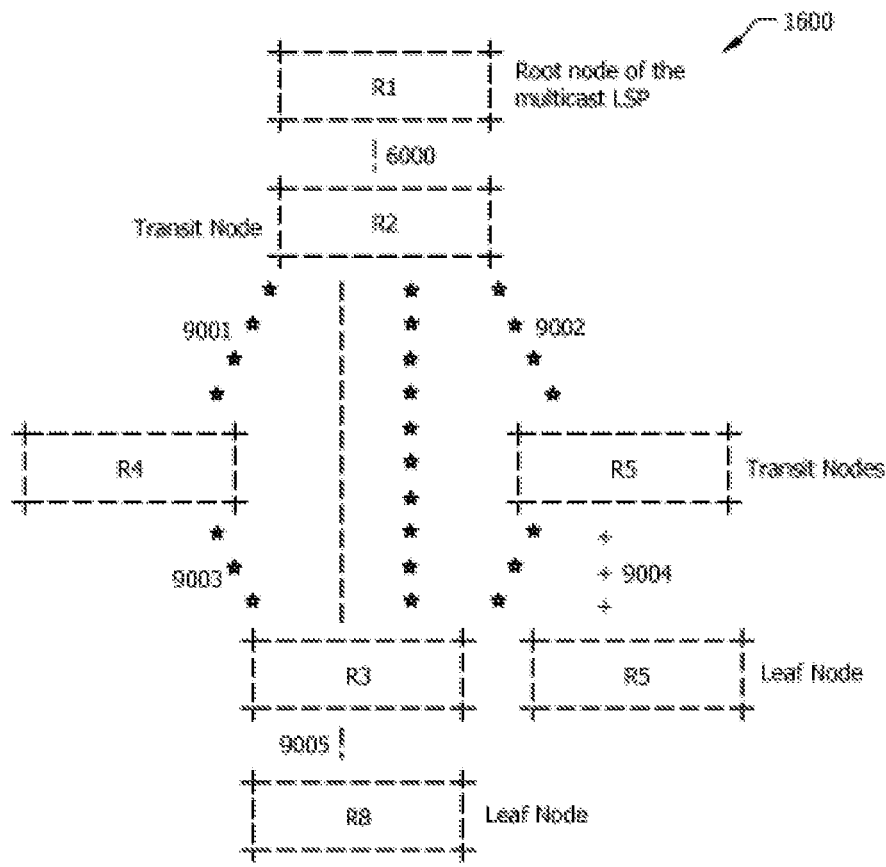
FIG. 16 is a schematic diagram of an embodiment of a method of using PCECC to manage point-to-multipoint (P2MP) TE LSP.

FIG. 16 is a schematic diagram of an embodiment of a method 1600 of using PCECC to manage P2MP TE LSP. Elements in FIG. 16 may be substantially similar to corresponding elements described in FIG. 4. Examples include using PCECC for P2MP/MP2MP LSPs' setup. With the capability of global label and local label existing at the same time in the PCECC network, PCECC is used to compute, setup, and maintain the P2MP and MP2MP LSP using the local label range for each network nodes, as illustrated in FIG. 16.

The P2MP examples are explained by the following steps:

Step1: R1 may send a packet P1 to R2 simply by pushing a label of 6000 to the packet.

Step2: After R2 receives the packet with label 6000, it will forward to R4 by pushing header 9001 and R5 by pushing header 9002.

Step3: After R4 receives the packet with label 9001, it will forward to R3 by pushing header 9003. After R5 receives the packet with label 9002, it will forward to R5 by pushing header 9004.

Step4: After R3 receives the packet with label 9003, it will forward to R8 by pushing header 9005.

Some embodiments include PCECC for the End-to-End Protection of the P2MP/MP2MP LSPs. In this section we describe the end to end managed path protection service and the local protection with the operation management in the PCECC network for the P2MP/MP2MP LSP, which includes both the RSVP-TE P2MP based LSP and also the mLDP based LSP. An end-to-end protection (for nodes and links) can be applied for computing backup P2MP or MP2MP LSPs. During computation of the primarily multicast trees, a PCECC server may also be taken into consideration to compute a secondary tree. A PCE may compute the primary and backup P2MP or MP2Mp LSP together or sequentially, as illustrated in FIG. 17.

Figure 17:
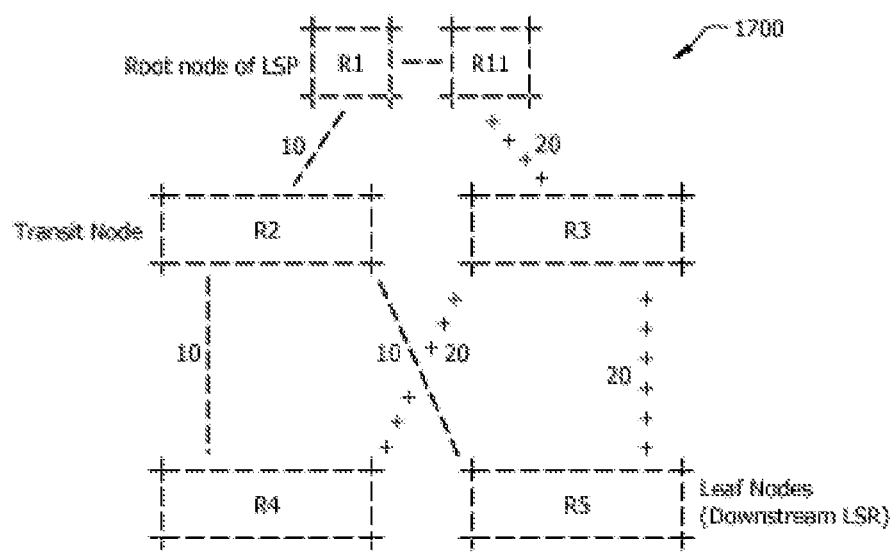
FIG. 17 is a schematic diagram of an embodiment of a method of using PCECC for P2MP TE end-to-end protection.

FIG. 17 is a schematic diagram of an embodiment of a method 1700 of using PCECC for P2MP TE end-to-end protection. Elements in FIG. 17 may be substantially similar to corresponding elements described in FIG. 4. In the example in FIG. 17, when the PCECC sets up the primary multicast tree from the root node R1 to the leafs, which is R1→R2→{R4, R5}, at the same time, it can setup the backup tree, which is R11→R3→{R4, R5}. Both of the primary forwarding tree and secondary forwarding tree are downloaded to each of the routers along the primary path and the secondary path. The traffic is forwarded through the R1→R2→{R4, R5} path normally, and when there is a failure in the primary tree, then the root node R1 switches the flow to the backup tree, which is R11→R3→{R4, R5}. By using the PCECC, the path computation and forwarding path downloading can all be done without the complex signaling used in the P2MP RSVP-TE or mLDP.

Embodiments also include the use of PCECC for the local protection of the P2MP/MP2MP LSPs. In this section we describe the local protection service in the PCECC network for the P2MP/MP2MP LSP. While the PCECC sets up the primary multicast tree, it can also build the back LSP among PLR, the protected node, and multi-points (MPs), e.g. the downstream nodes of the protected node. In the cases where the amount of downstream nodes is huge, this mechanism can avoid unnecessary packet duplication on PLR, so that protect the network from traffic congestion risk.

Figure 18:
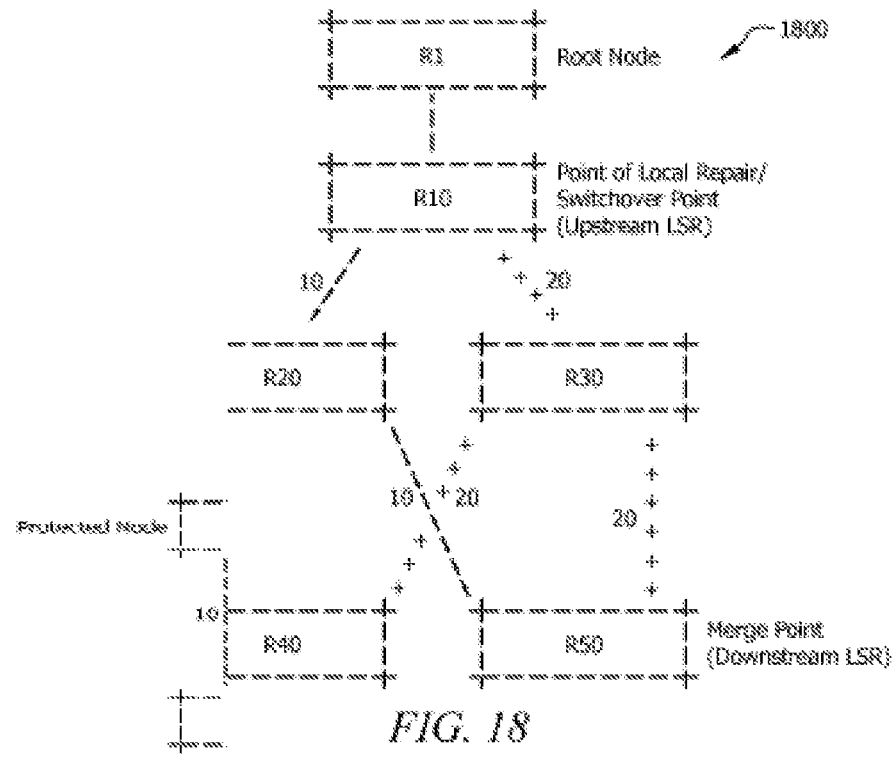
FIG. 18 is a schematic diagram of an embodiment of a method of using PCECC for P2MP TE Local Protection.

FIG. 18 is a schematic diagram of an embodiment of a method 1800 of using PCECC for P2MP TE Local Protection. Elements in FIG. 18 may be substantially similar to corresponding elements described in FIG. 4. In the example in FIG. 18, when the PCECC sets up the primary multicast path around the PLR node R10 to protect node R20, which is R10→R20→{R40, R50}, at the same time, it can setup the backup path R10→R30→{R40, R50}. Both of the primary forwarding path and secondary forwarding path are downloaded to each of the routers along the primary path and the secondary path. The traffic is forwarded through the R10→R20→{R40, R50} path normally, and when there is a node failure for node R20, then the PLR node R10 switches the flow to the backup path, which is R10→R30→{R40, R50}. By using the PCECC, the path computation and forwarding path downloading can all be done without the complex signaling used in the P2MP RSVP-TE or mLDP.

Some embodiments include use cases of PCECC for LSP in the network migration. One of the main advantages for PCECC solution is that it has backward compatibility naturally since the PCE server itself can function as a proxy node of MPLS network for all the new nodes which do not support the existing MPLS signaling protocol.

Figure 19:
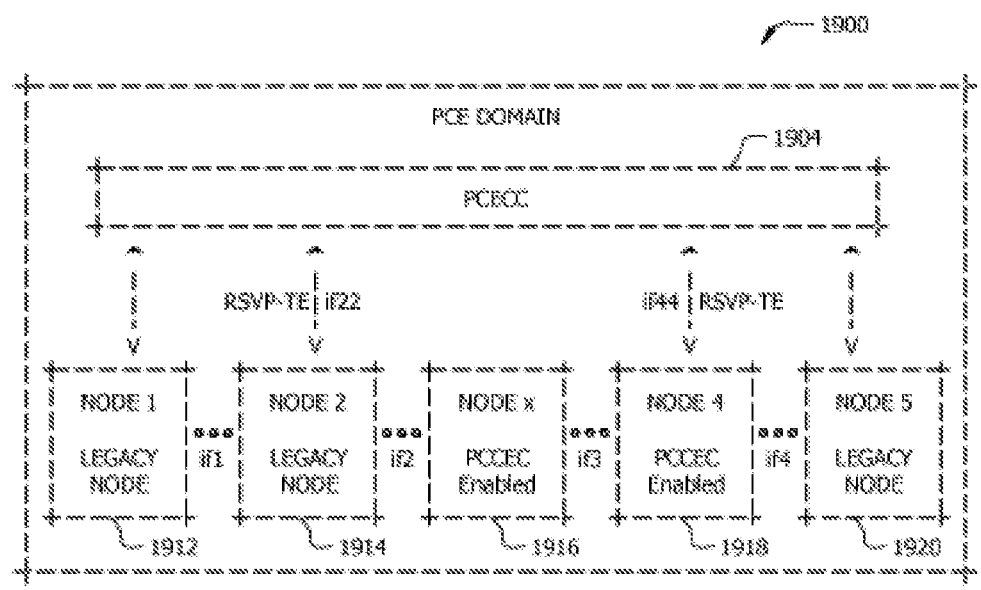
FIG. 19 is a schematic diagram of an embodiment of a method of using PCECC to manage migration to SDN.

FIG. 19 is a schematic diagram of an embodiment of a method 1900 of using PCECC to manage migration to SDN. Elements in FIG. 19 may be substantially similar to corresponding elements described in FIG. 4. As illustrated in the following example of FIG. 19, the current network will migrate to a total PCECC 1904 controlled network domain gradually by replacing the legacy nodes 1912, 1914, 1920. During the migration, the legacy nodes still need to signal using the existing MPLS protocol such as LDP and RSVP-TE, and the new nodes 1916 and 1918 setup their portion of the forwarding path through PCECC 1904 directly. With the PCECC 1904 functioning as the proxy of these new nodes 1916 and 1918, MPLS signaling can populate through the network as normal. Examples described in this section are based on network configurations illustrated using FIG. 19.

Examples include PCECC initiated LSP setup in the network migration. In this example, there are five nodes for the TE LSP from head end (node1) to the tail end (node5). Where the NodeX is central controlled and other nodes are legacy nodes. Node1 sends a path request message for the setup of LSP destined for Node5. PCECC sends a reply message for LSP setup with path (node1, if1), (node2, if22), (node-PCECC, if44), (node4, if4), node5. Node1, Node2, Node-PCECC, Node 5 sets up the LSP to Node5 normally using the local label as normal. Then the PCECC programs the outsegment of Node2, the insegment of Node4, and the insegment/outsegment for NodeX.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Additional information regarding the above disclosure may be found in the documents attached hereto.

What is claimed is:

1. A Path Computation Element (PCE) comprising:
   a receiver configured to receive a path computation request from a path computation client (PCC), the path computation request requesting computation for a path from a head end node to a tail end node;
   a processor coupled to the receiver and configured to:
      compute the path from the head end node to the tail end node in response to the path computation request, wherein the computed path comprises a legacy node and a Software Defined Network (SDN) node, wherein the legacy node is adjacent to the SDN node in the computed path; and
      assign a first Multiprotocol Label Switching (MPLS) label for the SDN node, wherein the first MPLS label is associated with a label switched path (LSP) which traverses each node in the computed path;
      assign a second MPLS label for the legacy node, wherein the second MPLS label is associated with the LSP, and wherein the legacy node needs to signal using MPLS protocol; and
   a transmitter coupled to the processor and configured to transmit the first MPLS label to the SDN node via PCE protocol (PCEP).

2. The PCE of claim 1, wherein the PCE is configured to negotiate with the legacy node to obtain a local label pool.

3. The PCE of claim 1, wherein the first MPLS label assigned to the SDN node is selected from a global label pool.

4. The PCE of claim 1, wherein the LSP is setup along the computed path without employing label distribution protocol (LDP) or resource reservation protocol (RSVP).

5. The PCE of claim 1, wherein the path computation request is received from the PCC in a PCEP path computation state report (PCRpt) message.

6. The PCE of claim 1, wherein the first MPLS label is transmitted directly to the SDN node in a PCEP path computation label forwarding information base download (PCLFIBDownload) message, and wherein the PCLFIBDownload message indicates an identifier (ID) for the LSP and the first MPLS label relevant to the SDN node.

7. The PCE of claim 1, wherein the receiver is further configured to receive a request from the PCC to delete the LSP, and wherein the transmitter is further configured to transmit a PCEP path computation label forwarding information base download (PCLFIBDownload) message to the SDN node, the PCLFIBDownload message comprising an identifier (ID) for the LSP and a reason (R) code indicating the first MPLS label associated with the LSP is to be deleted.

8. The PCE of claim 1, wherein the receiver is configured to receive a request from the PCC to modify the LSP, wherein the modification request indicates a first identifier (ID) for the LSP, and wherein the processor is configured to assign a second ID for the LSP, and wherein the transmitter is configured to:
   transmit a PCEP path computation label forwarding information base download (PCLFIBDownload) message the SDN node indicating the second ID for the LSP; and
   transmit a PCEP path computation state report (PCRpt) message comprising the first ID and a reason (R) code indicating the first MPLS label associated with the first ID is to be deleted.

9. The PCE of claim 1, wherein the PCC is embedded in the head end node that is located in an access network, wherein the tail end node is located in an aggregation network, wherein the computed path comprises a intermediate node that is located in an access control gateway (ACG) positioned on a border of the access network and the aggregation network, and wherein the LSP spans a plurality of network domains.

10. The PCE of claim 2, wherein the second MPLS label assigned to the legacy node is selected from the local label pool.

11. The PCE of claim 1, wherein the transmitter further configured to transmit the second MPLS label to the legacy node via the PCEP.

* * * * *